United States Patent [19]

Fukaya et al.

[11] Patent Number: 5,426,084
[45] Date of Patent: Jun. 20, 1995

[54] HIGHLY HEAT-RESISTANT METALLIC CARRIER FOR AN AUTOMOBILE CATALYST

[75] Inventors: Masuhiro Fukaya; Keiichi Ohmura; Mikio Yamanaka, all of Futtsu; Fumio Fudanoki; Hidehiko Sumitomo, both of Hikari, all of Japan

[73] Assignee: Nippon Steel Corporation, Tokyo, Japan

[21] Appl. No.: 140,096

[22] PCT Filed: Mar. 31, 1992

[86] PCT No.: PCT/JP92/00399

§ 371 Date: Nov. 2, 1993

§ 102(e) Date: Nov. 2, 1993

[87] PCT Pub. No.: WO93/17789

PCT Pub. Date: Sep. 16, 1993

[30] Foreign Application Priority Data

Mar. 2, 1992 [JP] Japan .................................. 4-044790

[51] Int. Cl.⁶ .......................... B01J 21/02; B01J 23/26
[52] U.S. Cl. ..................................... 502/439; 502/527; 148/325; 428/606; 420/40; 420/62
[58] Field of Search ............... 502/439, 314, 316, 527; 148/603, 597; 428/606, 325; 420/40, 62

[56] References Cited

U.S. PATENT DOCUMENTS

| | | | |
|---|---|---|---|
| 4,414,023 | 11/1983 | Aggen et al. | 502/439 |
| 4,867,811 | 9/1989 | Wakiyama et al. | 148/277 |
| 4,904,540 | 2/1990 | Ishii et al. | 428/606 |
| 5,160,390 | 11/1992 | Yukumoto et al. | 428/606 |
| 5,164,350 | 11/1992 | Abe et al. | 502/66 |
| 5,228,932 | 7/1993 | Shimizu et al. | 420/40 |
| 5,281,128 | 1/1994 | Dalla Betta et al. | 502/262 |

FOREIGN PATENT DOCUMENTS

| | | |
|---|---|---|
| 63200/90 | 8/1991 | Australia . |
| 0348575 | 1/1990 | European Pat. Off. . |
| 0402640 | 12/1990 | European Pat. Off. . |
| 2323442 | 4/1977 | France . |
| 64-30653 | 2/1989 | Japan . |
| 1-159384 | 6/1989 | Japan . |
| 3-166337 | 7/1991 | Japan . |
| 3-170642 | 7/1991 | Japan . |
| 2081747 | 2/1982 | United Kingdom . |

*Primary Examiner*—Anthony McFarlane
*Attorney, Agent, or Firm*—Wenderoth, Lind & Ponack

[57] ABSTRACT

A metallic carrier for an automobile catalyst, comprising a metallic honeycomb and a jacket, characterized in that a foil material constituting the metallic honeycomb is comprised of an Fe-Cr-Al-base alloy and has high-temperature proof stresses of 22 kgf/mm² or more and 11 kgf/mm² or more respectively at 600° C. and 700° C. with the foil material as annealed at a temperature of the recrystallization temperature of the foil material or above.

7 Claims, 5 Drawing Sheets

HIGHLY HEAT-RESISTANT METALLIC CARRIER FOR AN AUTOMOBILE CATALYST

TECHNICAL FIELD

The present invention relates to a highly heat-resistant metallic carrier for an automobile catalyst, that can cope with an increase in the temperature of an automobile engine exhaust gas.

BACKGROUND ART

A ceramic honeycomb composed mainly of cordierite has hitherto been used extensively as a carrier for a catalyst for rendering an automobile exhaust pollution-free. In recent years, the advantages of a metallic honeycomb comprising a stainless steel foil have been recognized, and the metallic honeycomb has begun to be mounted on some high grade passenger cars, which has led to an increasing tendency that the number of the metallic honeycombs installed in automobiles has gradually increased. The advantages of the metallic honeycomb include the following: ① since the temperature rise rate at the start of an engine is higher than that in the case of the ceramic honeycomb, the metallic honeycomb can begin to exhibit catalytic activity for purifying the exhaust gas earlier than the ceramic honeycomb, which contributes to a reduction in the amount of release of toxic gases; ② since the wall thickness is half or smaller than that of the ceramic honeycomb, the exhaustion resistance becomes so small that the output loss of the engine is small; ③ the surface area per unit volume of the honeycomb is so large that it is possible to relatively reduce the size; and ④ in the ceramic honeycomb, a cushioning material comprising a wire of inconel or a high grade stainless steel should be interposed between the honeycomb and the jacket and, due to poor heat resistance of the cushioning material, there is a limitation on an increase in the temperature of the exhaust gas, whereas the metallic honeycomb is directly joined to the jacket, so that no cushioning material is needed and it can be disposed at a higher temperature portion immediately behind the engine manifold to shorten the build up time of the purification activity of the catalyst.

The metallic honeycomb can be used at a higher temperature than the ceramic honeycomb. In recent years, however, there is an ever-increasing demand for lean burn and high speed running with low fuel consumption against the background of tightening of CAFE and regulation of exhaust gases, which has lead to a tendency of a further increase in the temperature of the exhaust gas from an automobile engine, so that, in some cases, the conventional metallic honeycombs cannot satisfy the new heat resistance requirements.

Specifically, the inlet gas temperature to which the conventional metallic honeycombs have been exposed was about 850° C. at the highest even when they were used immediately behind the engine manifold. In recent years, however, the inlet gas temperature often reaches 900° to 1,000° C. This has made it impossible for the conventional metallic honeycombs to pass a strict test for durability requirements.

For example, as described on pages 70 to 80 of "Nikkei Mekanikaru (Nikkei Mechanical)", No. 20 issued on January in 1992, an improvement in the oxidation resistance of the honeycomb has been considered as the first requirement to be satisfied for improving the heat resistance of the metallic honeycomb. For this reason, as disclosed in, for example, Japanese Unexamined Patent Publication (Kokai) Nos. 92286/1975, 48473/1976 and 71898/1982, attention has been directed to the oxidation resistance of a foil material for a metallic honeycomb and the adhesion of a film, and use has been made of a foil comprising, as a base material, an Fe-Cr-Al-base alloy, which has hitherto been extensively used as a heating wire and a high-temperature member for heaters by virtue of its excellent oxidation resistance and adhesion as a film, and having improved heat resistance or adhesion to an activated alumina ($\gamma$-$Al_2O_3$) coated layer serving directly as a carrier for the catalyst. In all the techniques disclosed in the above-described publications, Y is utilized as means for improving the oxidation resistance of the material.

On the other hand, Japanese Examined Patent Publication (Kokoku) No. 2-58340 proposes an Fe-Cr-Al-base alloy containing 0.06% by weight in total of rare earth elements including 0.002 to 0.05% by weight of a rare earth element selected from La, Ce, Pr and Nd added mainly for the purpose of preventing peeling of an oxide film of the alloy and an Fe-Cr-Al-base alloy containing Zr for the purpose of stabilizing the alloy and Nb in an amount enough to satisfy a particular relationship thereof with the C content and N content for the purpose of ensuring the high-temperature creep strength. In these publications, there is a description to the effect that, when the total content of the rare earth elements exceeds 0.06% by weight, no significant improvement in the oxidation resistance can be attained as compared with a total content of 0.06% by weight or less and, further, it becomes impossible to effect working at conventional hot working temperatures.

Similarly, Japanese Unexamined Patent Publication (Kokai) No. 63-45351 proposes an Fe-Cr-Al-base alloy wherein the above-described rare earth element exclusive of Ce or La alone are added in an amount in the range of from 0.05 to 0.2% by weight because the addition of Y increases the production cost. According to the description of the publication, the proposal is based on a finding that the presence of Ce is causative of a lowering in the hot workability attributable to the addition of the above-described rare earth elements and also deteriorates the oxidation resistance and the addition of the rare earth elements exclusive of Ce alone renders the material hot-workable and further contributes to an improvement in the oxidation resistance. However, the rare earth elements are very reactive and similar to one another in the chemical properties, so that the separation of individual rare earth elements is not easy, which renders the separated rare earth elements very expensive as compared with a mischmetal comprising a conventional mixture of rare earth elements. For this reason, as with the sole use of La, the separation and removal of Ce alone inevitably incurs an increase in the cost. Further, Japanese Unexamined Patent Publication (Kokai) No. 63-42356 of which the applicant is the same as that of the above-described Japanese Unexamined Patent Publication (Kokai) No. 63-45351 discloses an Fe-Cr-Al-base alloy which is excellent in oxidation resistance and peeling resistance of oxide scale and contains 0.01 to 0.30% in total of Ce, La, Pr and Nd. In this publication, however, no study has been made on the hot workability of the alloy.

In the above-described prior art, although the adhesion and oxidation resistance of an oxide film have been studied with a view to improving the heat resistance of the metallic carrier, the influence of the foil material on the durability of the honeycomb structure, for example, high-temperature proof stress, which is a very important necessary property for a foil constituting a honeycomb of the catalyst from the practical point of view, has not been studied at all.

The present invention has been made with a view to solving the problem of lack of heat resistance of the conventional metallic carrier associated with an increase in the temperature of automobile engine exhaust, and an object of the present invention is to provide a highly heat resistant metallic carrier capable of withstanding engine exhaust having a higher temperature (900° to 1,000° C.).

CONSTRUCTION OF INVENTION

In order to attain the above-described object, the metallic carrier for a catalyst according to the present invention comprises a honeycomb and a jacket, wherein the honeycomb comprises a foil material comprising an Fe-Cr-Al-base alloy and having high-temperature proof stresses of 22 kgf/mm$^2$ or more and 11 kgf/mm$^2$ or more at 600° C. and 700° C. respectively, the foil material being annealed at a temperature of the recrystallization temperature of the foil material or above.

Further, chemical ingredients constituting the foil material have been specified as one means for attaining the above-described high-temperature proof stress.

Specifically, precipitation strengthening or solid-solution strengthening elements, such as Ta, Nb, Mo and W, are added in a given amount to the foil material for the purpose of enhancing the proof stress of the foil material in the temperature range of from 600° to 700° C. In fact, experiments conducted by the present inventors have revealed that the metallic carrier comprising the above-described foil material having a high proof stress can withstand an engine bench thermal shock durability test wherein the maximum temperature is 950° C.

BEST MODE FOR CARRYING OUR THE INVENTION

The best mode for carrying out the invention will now be described in detail.

In order to prepare the above-described metallic honeycomb capable of withstanding a high inlet gas temperature of 900° to 1000° C., the present inventors first conducted the following engine bench durability test of a metallic carrier.

Figure 5:
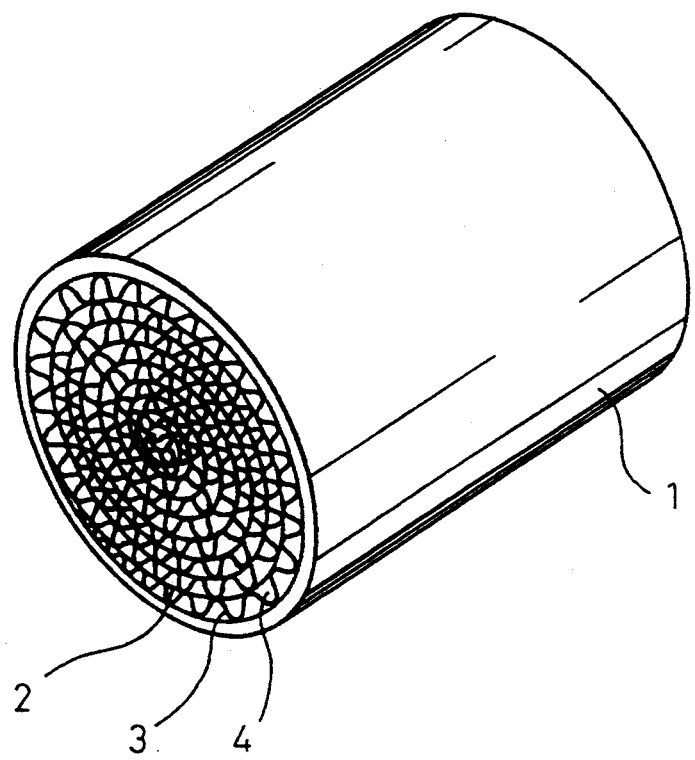
FIG. 5 is a perspective view of an embodiment of the structure of a metallic carrier.

Specifically, a metallic carrier as shown in FIG. 5, which comprises a metallic honeycomb (20Cr-5Al-0.05Ti-0.08REM) having a diameter of 75 mm and a length of 100 mm and comprising a corrugated foil and flat foil and a jacket surrounding the outside of the metallic honeycomb, was used as an example of the metallic carrier structure and subjected to a thermal shock test wherein increasing of the temperature from 150° C. to 950° C. followed by decreasing of the temperature from 950° C. to 150° C. (the maximum temperature being 100° C. above that of the conventional test) is repeated 1,200 times.

As a result, it has been found that even a metallic carrier, which can withstand the conventional thermal shock test with the maximum temperature being 850° C., is broken under the above-described new conditions. The broken site was several mm inside the outermost periphery, and the base material portion of the corrugated plate removed from the joint of foils constituting the honeycomb was broken in the direction of flow of exhaust, which caused the inner honeycomb to be deviated in the direction of flow of exhaust. The qualitative reason for the breaking is that, in the stage of rapidly increasing and decreasing the temperature, there is a period of time that a temperature difference of 400° C. or more occurs between the jacket of a thin stainless steel sheet for holding the honeycomb and the honeycomb, and, at that time, a thermal strain caused by this temperature difference becomes large enough to remarkably penetrate into a plastic region beyond the elastic limit, so that the rise and fall of the thermal strain induce thermal fatigue failure of the honeycomb.

In the heat cycle of the metallic carrier, heating gives rise to a rapid increase in the internal temperature of the honeycomb, while the temperature rise rate of the jacket is low during the heating. This causes a temperature difference between the jacket and the interior of the honeycomb, and the temperature difference is rapidly expanded. However, after a while, since the jacket also becomes heated, the temperature difference is reduced, and a further reduction in the temperature difference is observed in the stage of cooling. Therefore, a period of time that the temperature difference between the jacket and the honeycomb is a maximum (400° C. or more) exists during each heat cycle.

The present inventors have analyzed the distribution of a shearing strain attributable to a heterogeneous temperature distribution when the maximum temperature difference has occurred between the jacket and the honeycomb by using a simplified thermoelastic-plastic model on the premise that use is made of the above-described metallic carrier. As a result, they have found that a rise and fall of a maximum thermal strain of about 0.7% or more occurs for each heat cycle in the honeycomb at its portion where a failure occurs in the above-described engine bench test.

Figure 1:
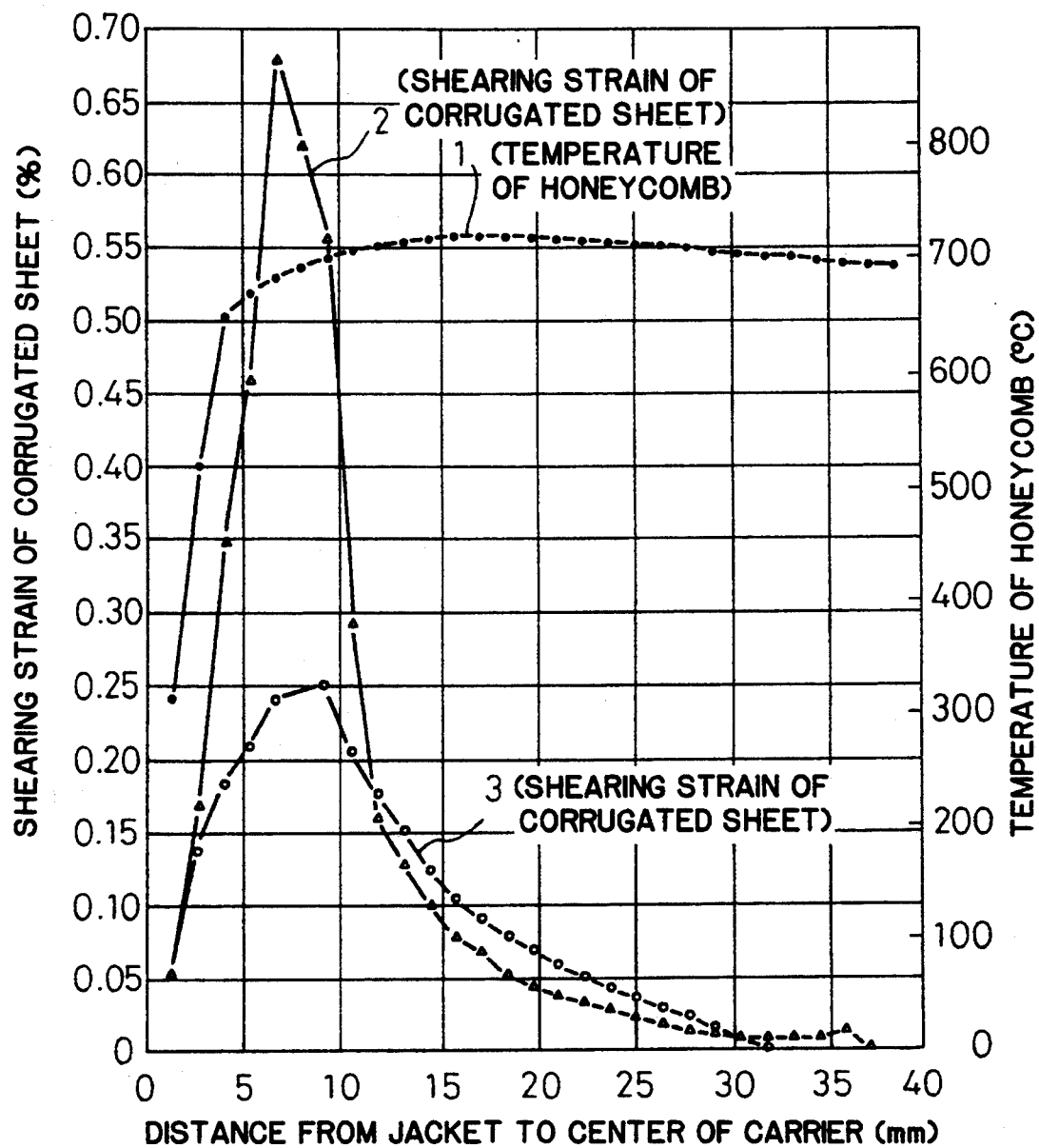
FIG. 1 is a diagram showing the relationship between the distance from a jacket to the center of a carrier of a honeycomb body and the temperature (curve 1) and the relationship between the number of plies of the carrier and the shearing strain of a corrugated sheet of a honeycomb body (curves 2 and 3), wherein curve 2 is for a conventional example and curve 3 is for an example of the present invention.

The results are shown in FIG. 1. In the drawing, curve 1 is obtained by effecting the above-described test with the metallic carrier mounted immediately behind an exhaust manifold to determine the temperature distribution at individual sites in the honeycomb from the jacket towards the center of the honeycomb and selecting a temperature curve in the case of the maximum temperature difference between the jacket and the honeycomb among the temperature curves for the respective heat cycles. The maximum temperature occurs when the site close to the center of the honeycomb is heated to about 700° C. In this case, a sharp temperature gradient (temperature difference between the honeycomb and the jacket: 400° C. or above) occurs in the honeycomb at a portion about 15 mm from the jacket.

Curve 2 represents the distribution of a shearing strain measured using the above-described thermoelastic-plastic model, wherein the shearing strain becomes maximum at a site having a sharp temperature gradient where there occurs a temperature change of 600° to 700° C. Although the sharpest temperature gradient is observed at temperatures of 600° C. or below, since the strength of the material increases with a lowering in the temperature, the shearing strain is lower than that in the above-described temperature range. Such a phenomenon is attributable to a change in the proof stress of the honeycomb material.

The present inventors have made studies on a change in 0.2% of proof stress with the temperature of the material and, as a result, have found that the proof stress of the material is rapidly lowered over the temperature range of 600° to 700° C. This is shown in curve 4 of FIG. 2.

Specifically, it has been found that a region where the temperature reaches 600° to 700° C. and gives rise to a rapid lowering in the proof stress of the material exists adjacent to a portion extending from a jacket 1 towards the outer periphery of a honeycomb 4 shown in FIG. 5 and having the sharpest temperature gradient, and a large shearing strain concentrates on this region.

In the metallic honeycomb, since a honeycomb is generally brazed directly to a jacket of a thin stainless steel sheet (thickness: 1.0 to 2 mm), a temperature difference between the jacket and the honeycomb causes a large part of the thermal strain to be applied to the honeycomb formed of a foil having a thickness (usually about 50 μm) much smaller than the outer casting material. Further, a temperature distribution exists also within the honeycomb, and the proof stress of the material varys depending upon the temperature distribution, so that the thermal strain concentrates on a region close to a portion having a sharp temperature gradient and the region having a relatively low proof stress of the material.

Thus, the present inventors have found that an improvement in the proof stress of the material at its portion in a temperature region where the high-temperature proof stress is rapidly lowered is very useful not only for reducing the thermal strain but also for improving the durability of the carrier.

Figure 2:
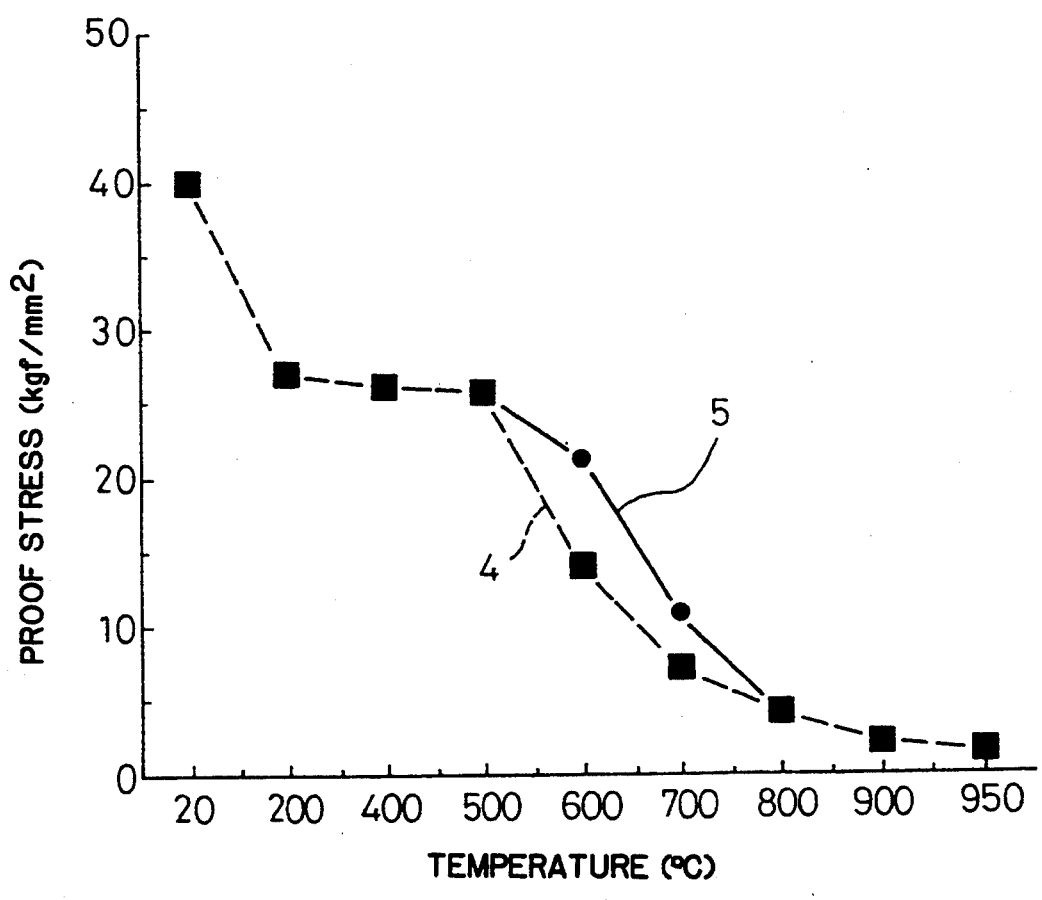
FIG. 2 is a diagram showing the relationship between the temperature of a honeycomb body and the high-temperature proof stresses of a conventional example (curve 4) and an example of the present invention (curve 5)

Based on this finding, the present inventors have prepared a hypothetic strength profile (curve 5 of FIG. 2) wherein the proof stresses at 600° C. and 700° C. indicated by curve 4 of FIG. 2 each have been increased by 50%, and determined the thermal strain distribution using the above-described thermoelastic-plastic model. As a result, it has been found that, as shown in curve 3 of FIG. 1, the maximum percentage shearing strain became 0.25% which was much lower than that in curve 2 of the same drawing.

Further, based on the above-described studies, the present inventors have also made studies on the optimum high-temperature proof stress in the temperature range in which a sharp temperature gradient is formed. As a result, they have found that, in order to maintain the durability of the metallic honeycomb where the inlet exhaust gas temperature reaches a high temperature region of 900° C. or above, it is very useful to bring the proof stresses at 600° C. and 700° C. of a foil comprising a ferritic stainless steel containing Al to 22 kgf/mm² or more and 11 kgf/mm² or more respectively with the foil annealed at a temperature at the recrystallization temperature of the foil or above.

The reason why the heat resisting stainless steel foil material for the honeycomb material in the metallic carrier is specified by the high-temperature proof stress (a value experimentally found as a yield stress) will now be described.

Since the metallic carrier is subjected to a rapid heating-cooling cycle, the thermal fatigue resistance becomes a problem to be solved for improving the heat resistance. The thermal fatigue resistance greatly depends upon the high-temperature proof stress in the tensile test. That is, enhancing the proof stress corresponding to the yield stress must be accomplished to improving the thermal fatigue resistance, and it is meaningless to specify the foil material by the tensile strength when the thermal strain has greatly penetrated into a plastic region.

Further, the creep strength does not relate directly to the thermal fatigue resistance of the metallic carrier. For this reason, in the present invention, the foil material is specified by the high-temperature proof stress.

The reason why the proof stress is specified with the foil as annealed at a temperature of the recrystallization temperature of the foil or above (900° C. or above for an Fe-Cr-Al-base alloy) is as follows. Specifically, when the foil material is as rolled or as annealed at a temperature below the recrystallization temperature, since the worked micro structure derived from the rolling remains as it is, there is a possibility that the material temporarily exhibits a high proof stress. Even though the proof stress is improved in this state, the proof stress derived from the worked micro structure disappears accompanying the disappearance of the worked micro structure in a high temperature region where the maximum temperature reaches 950° C., so that there is a possibility that a desired proof stress cannot be maintained. For this reason, the proof stress should be specified with the material as annealed at a temperature of the recrystallization temperature or above at which the worked micro structure disappears.

In the present invention, the strain rate used in specifying the proof stress is one used in the conventional method, that is, the tensile test specified in JIS, that is, 0.1%/min.

This is because the order of the strain rate coincides with that of the honeycomb material as the metallic carrier in a thermal shock test, that is, the strain rate is not very different from that of the honeycomb material as the metallic carrier in a thermal shock test, so that the use of the above-described strain rate is suitable for the evaluation of phenomena caused in the actual honeycomb materials.

As described above, in the present invention, given amounts of Nb, Ta, Mo and W are added as means for enhancing the proof stress of the honeycomb foil material at 600° C. and 700° C. The effect attained by adding these elements will now be described in terms of the addition of Nb.

Figure 3:
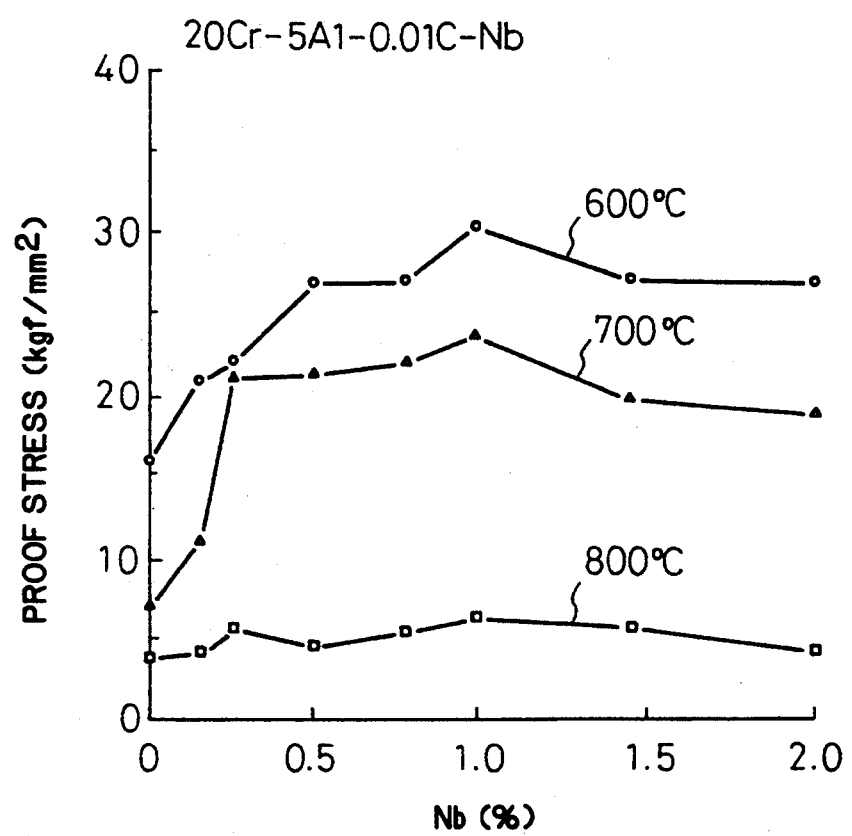
FIG. 3 is a diagram showing the relationship between the amount of Nb added and the proof stress.

FIG. 3 is a diagram provided by plotting data obtained by subjecting a material comprising 20% of Cr, 5% of Al and 0.01% of C and, added thereto, 0 to 2.0% of Nb to the measurement of proof stresses at 600° C., 700° C. and 800° C. In the material containing Nb, both the proof stresses at 600° C. and 700° C. are improved over those of the material not containing Nb. In particular, when the amount of Nb added is 1%, the proof stress at 600° C. of the material is twice (about 30 kgf/mm$^2$) the proof stress (about 15 kgf/mm$^2$) of the material not containing Nb and the proof stress at 700° C. of the material is about 3.5 times (about 24 kgf/mm$^2$) the proof stress (7 kgf/mm$^2$) of the material not containing Nb, that is, an enhancement in the proof stress is significant. It is noted that, at 800° C., the proof stress of the material containing Nb is substantially the same as that of the material not containing Nb and no effect can be attained by the addition of Nb. From these results, it is apparent that a marked improvement in the proof stresses at 600° C. and 700° C. can be attained by the addition of Nb.

Figure 4:
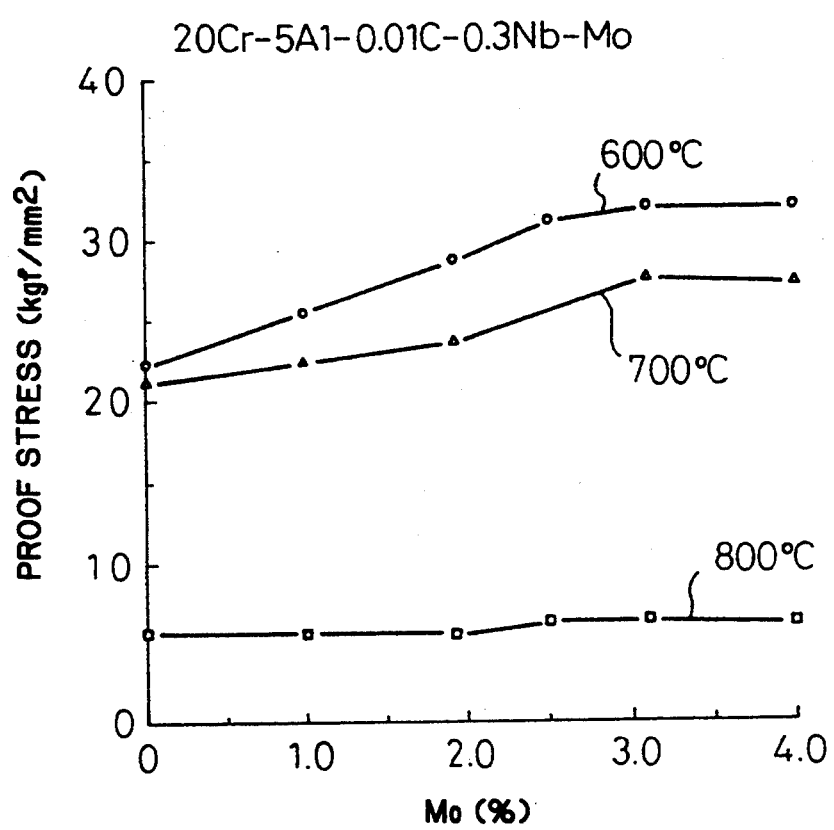
FIG. 4 is a diagram showing the relationship between the amount of Mo added and the proof stress when Nb is added in combination with Mo.

FIG. 4 is a diagram provided by plotting data obtained by subjecting a material comprising the same base alloy as shown in FIG. 3 and, added thereto, 0.3% of Nb in combination with 0 to 4.0% of Mo to the measurement of proof stresses in the temperature range of 600° to 800° C. The effect of Nb and Mo added in combination is apparent from FIG. 4.

In the honeycomb material of the present invention, besides the high-temperature proof stress improving elements, Ln (Ln being at least one element selected from the group consisting of La, Pr, Ce and Nd) or Y is added for the purpose of improving the oxidation resistance and the adhesion of an oxide film. A problem of a lowering in the hot workability due to the addition of Ln as disclosed in Japanese Examined Patent Publication (Kokoku) No. 2-58340 and Japanese Unexamined Patent Publication (Kokai) No. 63-45351 can be solved by the combined use of P and Ln. When Y is added, a more inexpensive Y misch (hereinafter referred to as "Ym") may be used for the purpose of minimizing the cost for ingredients of the foil. Ym comprises about 60% of Y, about 35% of heavy rare earth elements (Gd, Tb, Dy, Ho, Er, Tm, Yb and Lu) and about 5% of light rare earth elements (La, Ce, Pr, Nd, Pm, Sm and Eu).

As described above, the honeycomb material of the present invention can provide a metallic carrier that is excellent in not only high-temperature proof stress but also oxidation resistance, adhesion of the oxide film and hot workability and can sufficiently withstand heat even when exposed to an exhaust gas having a temperature of 900° C. or above.

Chemical ingredients capable of realizing the high-temperature proof stress contemplated in the present invention will now be described.

The heat resistant stainless steel foil material of the present invention may be a steel product comprising, in terms of % by weight, more than 0.01 to 0.5% of Y, 4.5 to 6.5% of Al, 13 to 25% of Cr, 0.025% or less of C and 0.02% or less of N, the total of C and N being 0.03% or less, and, further, at least one member selected from the group consisting of (93.C/12+93.N/14)×1.1% to 3% of Nb, (181.C/12+181.N/14)×1.5% to 3% of Ta, 1 to 4% of Mo and 1 to 4% of W, the total of Nb and Ta being 3% or less, the total of Mo and W being 4% or less, with the balance consisting of Fe and unavoidable impurities.

Further, the above-described heat resisting stainless steel foil material may be a steel product comprising, in terms of % by weight, more than 0.01 to 0.5% of Ym, 4.5 to 6.5% of Al, 13 to 25% of Cr, 0.025% or less of C and 0.02% or less of N, the total of C and N being 0.03% or less, and, further, at least one member selected from the group consisting of (93.C/12+93.N/14)×1.1% to 3% of Nb, (181.C/12+181.N/14)×1.5% to 3% of Ta, 1 to 4% of Mo and 1 to 4% of W, the total of Nb and Ta being 3% or less, the total of Mo and W being 4% or less, with the balance consisting of Fe and unavoidable impurities.

Further, the above-described heat resisting stainless steel foil material may be a steel product comprising, in terms of % by weight, more than 0.01 to 0.5% of Y, 4.5 to 6.5% of Al, 13 to 25% of Cr, 0.02% to (0.03+4.C+24.N/7) % of Ti, more than (93.C/12+93.N/14) % to 2.0% of Nb, 0.025% or less of C and 0.02% or less of N, the total of C and N being 0.03% or less, with the balance consisting of Fe and unavoidable impurities.

Further, the above-described heat resisting stainless steel foil material may be a steel product comprising, in terms of % by weight, more than 0.01 to 0.5% of Ym, 4.5 to 6.5% of Al, 13 to 25% of Cr, 0.02% to (0.03+4.C+24.N/7) % of Ti, more than (93.C/12+93.N/14) % to 2.0% of Nb, 0.025% or less of C and 0.02% or less of N, the total of C and N being 0.03% or less, with the balance consisting of Fe and unavoidable impurities.

Further, the above-described heat resisting stainless steel foil material may be a steel product comprising, in terms of % by weight, more than 0.06 to 0.15% of Ln, 8×(Ln+0.015)/45% to 0.1% of P, 4.5 to 6.5% of Al, 13 to 25% of Cr, 0.025% or less of C and 0.02% or less of N, the total of C and N being 0.03% or less, and, further, at least one member selected from the group consisting of (181.C/12+181.N/14)×1.5% to 3% of Ta, (93.C/12+93.N/14)×1.1% to 3% of Nb, 1 to 4% of Mo and 1 to 4% of W, the total of Ta and Nb being 3% or less, the total of Mo and W being 4% or less, with the balance consisting of Fe and unavoidable impurities.

Further, the above-described heat resisting stainless steel foil material may be a steel product comprising, in terms of % by weight, more than 0.06 to 0.15% of Ln, 8×(Ln+0.015)/45% to 0.1% of P, 4.5 to 6.5% of Al, 13 to 25% of Cr, 0.02% to (0.03+4.C+24.N/7) % of Ti, more than (93.C/12+93.N/14) % to 2.0% of Nb, 0.025% or less of C and 0.02% or less of N, the total of C and N being 0.03% or less, with the balance consisting of Fe and unavoidable impurities.

The reason for the limitation of the above-described ingredients will now be described.

(1) Ta:

Ta is an additive element important to the present invention from the viewpoint of improving the proof stress of the foil at high temperatures and improving the durability of the structure of the carrier for a catalyst. Ta combines with C and N contained in the steel to form a carbonitride that gives rise to the so-called "precipitation strengthening". In addition, excess carbonitride is dissolved in a solid solution form in the matrix to cause solid solution strengthening, and these contributes to an improvement in the high-temperature proof stress. In this case, the effect of precipitation strengthening is large. However, precipitates often aggregate and coarsen during use of the carrier, for example, at a temperature exceeding 750° C. for a long period of time to cause a change in the metallic structure, which lowers the effect of precipitation strengthening. On the other hand, although the effect of solid solution strengthening is not as large as the effect of precipitation strengthening, no significant lowering in the above-described function and effect attributable to a change in the metallic structure occurs even when the carrier was used for a long period of time. For this reason, even when the precipitation strengthening is lost by the above-described-phenomenon, it is necessary to add Ta in a somewhat excess over the amount of C and N for the purpose of sustaining the solid solution strengthening effect. Studies conducted by the present inventors from this point of view have revealed that the addition of Ta in an amount of $(181.C/12+181.N/14) \times 1.5\%$ or more is necessary.

However, the presence of an extreme excess of Ta causes a Laves phase to be precipitated, a steel ingot as cast to become liable to crack and, further, the high-temperature proof stress to fall. The Ta content is 3% from the viewpoint of the relationship thereof with the C content and N contents specified in the present invention. For the reasons set out above, the amount range of Ta added is as follows.

Ta: $(181.C/12+181.N/14) \times 1.5\%$ to 3%

Further, since Ta immobilizes C and N, it has the effect of improving the toughness of the hot-rolled sheet. This effect can be sufficiently attained when Ta is added in the above-described amount range.

(2) Nb:

As with Ta, Nb is an additive element important to the present invention from the viewpoint of improving the proof stress of the foil at high temperatures and improving the durability of the structure of the carrier for a catalyst. As with Ta, Nb serves to improve the high-temperature proof stress by taking advantage of both precipitation strengthening and solid solution strengthening. Further, as with Ta, the amount range of Nb added is limited by the relationship thereof with the amounts of C and N, and the amount of Nb should be at least $(93.C/12+93.N/14) \times 1.1\%$.

On the other hand, as with Ta, Nb forms a Laves phase when it is added in an extreme excess, which leads to the same adverse effect as described above in connection with Ta. The upper limit of the Nb content is specified from this point of view. According to studies conducted by the present inventors, it is 3%. For the reasons set out above, the amount range of Nb added is as follows.

Nb: $(93.C/12+93.N/14) \times 1.1\%$ to 3%

Further, Nb has the effect of significantly improving the toughness of the hot-rolled sheet. This effect can be sufficiently attained when Ta is added in the above-described amount range.

For the same reason, when Ta and Nb are added in combination, the upper limit of the total amount Ta and Nb is 3%.

When Nb is added in combination with Ti, which will be described later, the amount of Nb added is separately specified.

When the high-temperature proof stress is improved by taking advantage of the solid solution strengthening by the addition of a relatively large amount of Mo and/or W, the addition of an excessive amount of Nb causes the steel ingot as cast to become liable to crack during cooling and, at the same time, sometimes deteriorates the hot workability and toughness. For this reason, the upper limit of the amount of Nb added is preferably $(93.C/12+93.N/14) \times 4.5\%$ which causes the effect of improving the toughness to begin to become saturated.

(3) Mo and W:

Mo or W is an additive element important to the present invention particularly from the viewpoint of improving the high-temperature proof stress and the durability of the structure of the carrier for a catalyst. Mo and W are dissolved in a solid solution form in the matrix of the steel to improve the high-temperature proof stress by taking advantage of solid solution strengthening. In this case, considerable amounts of Mo and W can be dissolved in a solid solution form without the formation of a detrimental precipitate phase, which contributes to a marked improvement in strengthening. Further, since they cause no significant change in the metallic structure, the strengthening effect hardly changes with time.

The amount of Mo and/or W added is determined from this point of view. According to the results of studies conducted by the present inventors, the amount of Mo added should be 1% or more for the purpose of attaining a satisfactory solid solution strengthening effect, and the lower limit of the amount of W added is also 1%.

Since a large part of both Mo and W are dissolved in a solid solution form, the metallic matrix is strengthened with an increase in the amount of Mo and W added. However, the addition of excessive amounts of Mo and W results in a lowering in toughness. Therefore, the amounts of Mo and W added are limited from this point of view, and the upper limit is 4% for both the elements. The same effect can be attained when Mo and W are added in combination. In this case, the upper limit of the total amount of Mo and W is preferably 4%.

As described above, in the present invention, the high-temperature proof stress can be improved by the addition of a suitable amount of Ta and/or Nb. In the strengthening effect exerted by Ta and Nb, in some cases, the precipitation strengthening effect is gradually deteriorated during use of the carrier at a high temperature, and the addition of these elements in an excessive amount unfavorably lowers the high-temperature proof stress. By contrast, the effect attained by the addition of Mo and/or W is not influenced by the presence of Ta and/or Nb, and Mo and W can be dissolved in considerable amounts in the matrix without the formation of any detrimental precipitate phase to provide a significant solid solution effect. That is, the addition of Mo and/or W to an alloy having a high-temperature strength improved by the addition of Ta and/or Nb enables the high-temperature proof stress to be further improved.

(4) Ti:

Ti is an additive element important to the present invention because it can improve the high-temperature proof stress when added in combination with Nb.

As described above, in order to improve the durability of the structure of the carrier for a catalyst, it is important to improve the high-temperature proof stress of the foil and, at the same time, to prevent the lowering in the improved proof stress even after heating for a long period of time. In the strengthening effect exerted by the addition of Ta or Nb, since the precipitation strengthening effect is attained mainly by the precipitation of a carbonitride formed by combining of Ta or Nb with C and N, in some cases, the carbonitride is gradually deteriorated during use of the carrier at a high temperature, which deteriorates the strengthening effect.

However, it is considered that, when a considerable amount of Nb is added after the addition of a minor amount of Ti, since C and N are precipitated as a Ti-based carbonitride, Nb can be dissolved in a solid solution form without forming a significant amount of a Nb-based carbonitride. This enables a relatively large strengthening effect to be stably attained particularly at high temperatures. Further, since Ti causes no significant change in the metallic structure even when heating is effected at a high temperature for a long period of time, the strengthening effect hardly changes with time. Further, as described above, since Ti immobilizes C and N in a solid solution form, it can improve the toughness of the hot-rolled sheet.

The amount of Ti and Nb added in combination is determined from this point of view. According to the results of studies conducted by the present inventors, in order to attain a satisfactory solid solution strengthening effect, Ti should be added in an amount of 0.2% in combination with Nb in an amount exceeding $(93 \cdot C/12 + 93 \cdot N/14)$ %. However, when the amount of Ti added is excessive, Ti forms a number of coarse square Ti-based precipitates having a size exceeding 10 μm and Nb form Nb forms a Nb-based intermetallic compound, which gives rise to a deterioration in the hot workability and the toughness of the hot-rolled sheet. The amounts of Ti and Nb added are limited from this point of view, and the upper limits of Ti and Nb contents are $(0.03 + 4 \cdot C + 24 \cdot N/7)$ % and 2.0%, respectively. It is noted that the addition of Ti and Nb in the above-described respective amount ranges has no adverse effect on the oxidation resistance of the foil. Ti is preferably added before the addition of Nb during the production of the steel by the melt process.

(5) C and N:

In the present invention, C and N cause a marked lowering in the toughness of the hot-rolled sheet. Although this adverse effect can be prevented by the action of Ta or Nb, the restoration of toughness becomes difficult when the C content exceeds 0.025%, the N content exceeds 0.02% or the total content of C and N exceeds 0.03%.

For this reason, the C content should be 0.025% or less, and the N content should be 0.02% or less, provided that the total content of C and N is 0.03% or less.

C and N precipitate as a carbonitride that exhibits such a favorable function and effect that the high-temperature proof stress is improved by the precipitation strengthening effect. As described above, the coarsening of the precipitates deteriorates this effect. When C and N are contained in large amounts in the steel, even though Ta and/or Nb are added in amounts exceeding the above-described lower limit values, the coarsening of the precipitates are accelerated to increases the rate of deterioration of the strengthening effect. That is, when C and N are contained in large amounts, the average grain size of the carbonitride becomes so large that it becomes difficult to attain homogeneous fine precipitation useful for precipitation strengthening. The contents of C and N are limited from this point of view, and in the present invention, the C content is 0.025% or less, the N content is 0.02% or less and the total content of C and N is 0.03% or less.

For the reasons set out above, the C and N contents should satisfy the following requirements.

C: 0.025% or less,
N: 0.02% or less, and
C+N: 0.03% or less.

(6) Y and Ym:

Y has the effect of improving the oxidation resistance and the resistance to abnormal oxidation of the foil. When the Y content exceeds 0.01%, a marked improvement in the time to the occurrence of abnormal oxidation, i.e., service life of the foil, can be attained over the service life of the foil having an Y content of 0.01% or less. However, when the Y content exceeds 0.5%, the service life again begins to lower. For this reason, the Y content is limited to more than 0.01 to 0.05%.

In the present invention, the so-called "Ym" which is more inexpensive, may be used as the actual additive material. As with the addition of Y, when the Ym content exceeds 0.01%, the service life of the foil, which is the time to the occurrence of the abnormal oxidation, can be significantly improved in comparison to the foil having a Ym content of 0.01 or less. However, when the Ym content exceeds 0.5%, the service life again begins to lower. For this reason, the Ym content is limited to more than 0.01 to 0.05%.

Even when Y is added in a large amount, the hot workability of the steel remains good as opposed to the Ln (lanthanoide) described below that lowers the hot workability when it is added in a large amount. This is because the addition of a large amount of Ln causes a low-melting Ce-rich phase, whereas the addition of a large of Y causes the Y to form a high-melting-point intermetallic compound with Fe. For this reason, when use is made of a large-size steel ingot having a large segregation ratio which has been mass-produced in a works, the addition of Y or Ym is more advantageous than the addition of Ln.

(7) Ln (lanthanoide):

Ln (lanthanoide) is a generic name for 15 elements beginning with La and ending with Lu in the period table. In the present invention, the so-called "misch metal", which is more inexpensive, may be actually added as a raw material for Ln. In this case, when the misch metal is analyzed, four elements of La, Ce, Pr and Nd are detected with other elements, i.e., Pm, Sm, Eu and Gd, that are present in very small amounts and hence negligible. Therefore, Ln used in the present invention can be regarded as a mixture of the above-described four elements.

When at least one element selected from La, Ce, Pr and Nd is added instead of the misch metal, the effect attained is equivalent to that attained by the misch metal. Therefore, the Ln of the present invention includes also these elements.

Ln has the effect of improving the resistance to abnormal oxidation of the foil in an exhaust gas. When the Ln content exceeds 0.06%, the service life of the foil, which is the time to the occurrence of abnormal oxidation in an exhaust gas, can be significantly improved in comparison to the foil having a Ln content of 0.06% or less. However, when the Ln content exceeds 0.15%, the service life again begins to lower. For this reason, the Ln content is limited to more than 0.06 to 0.15%.

(8) P:

P is an element important to the present invention from the viewpoint of improving the hot workability in relation to Ln.

Specifically, in the present invention, the addition of Ln in an amount in the above-described range enables the oxidation resistance of the foil to be significantly improved. In the prior art, however, the recognition with respect to the addition of Ln was that the addition of Ln is detrimental to the hot workability, which makes it difficult to produce a foil in the conventional process for mass-producing a stainless steel sheet through a hot-rolled coil. This difficulty has been considered attributable to the fact that Ce as a main ingredient of the misch metal is liable to form a low-melting-point Ce-rich phase. However, it is noted that, when Ln is added in a large amount, the addition of Ln in combination with P causes, for example, part of Ce and La to exist as a relatively fine particulate high-melting-point phosphide having a size of 3 $\mu$m or less in the steel, so that the lowering in the hot workability does not occur at all. With respect to the P content necessary for this purpose, studies conducted by the present inventors have revealed that the lower limit of the P content is $8 \times (Ln + 0.015)/45\%$ on the premise that the Ln content is in the range of from more than 0.06 to 0.15% and use is made of a large-size steel ingot having a high segregation ratio which has been mass-produced in a steel mill. When Ln is not added, there is no need of specifying the lower limit of the P content.

On the other hand, since P lowers the toughness of a ferritic stainless steel, the P content is limited from this point of view for the Fe-Cr-Al-base stainless steel inherently having a poor toughness, so that, in the present invention, the upper limit of the P content is 0.1%. The addition of P in an amount in the above-described range has no adverse effect on the oxidation resistance of the foil.

(9) Al:

Al is an fundamental element indispensable to the present invention for ensuring the oxidation resistance. In the case of a foil, when the Al content of the foil is less than 4.5%, the protection of the oxide film in an exhaust gas is so poor that abnormal oxidation is liable to occur, which renders the foil unsatisfactory for use as the catalyst carrier. On the other hand, when the Al content exceeds 6.5%, the toughness of the hot-rolled sheet is extremely lowered, which is detrimental to the producibility. In addition, the coefficient of thermal expansion of the foil becomes so large that, if such a foil is used as a catalyst carrier, the thermal fatigue accompanying the repetition of heating and cooling is large. For this reason, in the present invention, the Al content is in the range of from 4.5 to 6.5%.

(10) Cr:

Cr is a fundamental element indispensable to the present invention for ensuring the corrosion resistance of the stainless steel. In the present invention, although the oxidation resistance derives mainly from an $Al_2O_3$ film, lack of Cr gives rise to a deterioration in the adhesion and protection of the $Al_2O_3$. On the other hand, when the Cr content is excessively high, the toughness of the hot-rolled sheet is deteriorated. For this reason, the Cr content is limited to 13 to 25%.

(11) Si:

Si has an adverse effect on the present invention and deteriorates the toughness of the hot-rolled sheet. Therefore, it is preferred to limit the Si content to about 0.5% or less that being the amount of Si inevitably included in common stainless steels.

(12) Other impurities:

Mn: Mn is concentrated within the oxide film particularly in a very early stage of the formation of the oxide film and is detrimental to the formation of the $Al_2O_3$ film after that, which is causative of the structural defect of the film, so that in the present invention it is preferred to limit the Mn content to 0.3% or less.

S: S deteriorates the oxidation resistance, so that in the present invention it is preferred to limit the S content to 0.003% or less.

Ni: Ni is strongly combined with Al to render the Fe-Cr-Al-base alloy remarkably brittle, so that in the present invention the Ni content is limited to 0.3% or less.

An about 50 $\mu$m-thick foil can be produced from the Fe-Cr-Al-base alloy having the above-described constitution according to the present invention by combining steps used for the mass production of conventional ferritic stainless steels, that is, steps of melting, hot rolling and cold rolling, optionally with the step of annealing. Further, the foil thus produced and a carrier for an exhaust gas purification catalyst and an exhaust gas purification catalyst device constructed using this foil exhibit a very high degree of resistance to the occurrence of abnormal oxidation even in a combustion exhaust gas atmosphere having a high temperature region of 900° C. or above and, in addition, a high degree of resistance to thermal fatigue as a honeycomb by virtue of a high proof stress at high temperatures of the foil, so that the structural durability is excellent even under service conditions where heating and cooling cycle are repeated.

EXAMPLES

The effect of the present invention will now be described in more detail.

Example 1

The chemical ingredients of the heat-resistant stainless steels according to the present invention and comparative materials are given in Table 1. All the materials are based on 20Cr-5Al, and the steels according to the examples of the present invention (A1 to A18) comprise the 20Cr-5Al and, added thereto, Y for the purpose of ensuring the oxidation resistance and Nb, Ta, Mo and W, either alone or in combination, for the purpose of enhancing the high-temperature proof stress. The comparative materials (A19 to A24) comprise the 20Cr-5Al alone with no strengthening element added or the 20Cr-5Al with, added thereto, Ti or the like.

100 kg of each of the steels specified in Table 1 was melted in a vacuum high frequency furnace, cast, heated to 1,200° C., hot-rolled with a reduction ratio of 30%, air-cooled, held at 1,150° C. for one hr and hot-rolled immediately after the completion of the holding into 4 mm-thick steel sheets that were then air cooled. The hot-rolled sheets were descaled by shot blasting, pickling, etc. and subjected to a series of steps of cold rolling (some alloys being hot-rolled), annealing and descaling to provide foil coils having a sheet thickness of about 50 $\mu$m. In this case, all the steels according to the examples of the present invention exhibited a good hot workability and a good toughness in the form of hot-rolled sheets.

When the foil materials were in a thin sheet form, they were annealed at 1,200° C. for 15 min and specimens for a high-temperature tensile test were sampled and subjected to a high-temperature tensile test according to the method specified in JIS to measure proof stresses at 600° C. and 700° C. Since the high-temperature proof stress of the thin sheet is fundamentally equivalent to that of the foil material, in the present invention, the high-temperature proof stress of the material in the form of a thin sheet was adopted because of the higher accuracy of measurement. The results are given in the column of the high-temperature proof stress of Table 2. Whether or not an increase in the high-temperature proof stress contemplated in the present invention could be attained was judged by comparing the measured values with standards, i.e., a proof stress of 22 kgf/mm$^2$ or more at 600° C. and a proof stress of 11 kgf/mm$^2$ or more at 700° C., and the proof stress was evaluated as O when the measured value met the standard while the proof stress was evaluated as X when the measured value did not meet the standard. The proof stress values are each the average of three experimental values. All the alloys according to the examples of the present invention exhibited a good high-temperature proof stress.

The oxidation resistance of each foil material was evaluated as follows. A specimen having a sheet thickness of 50 μm, a width of 20 mm and a length of 25 mm was sampled from a foil coil and subjected to an oxidation test in a heating furnace into which an exhaust gas was discharged from a gasoline engine. In this case, a test wherein the specimen was heated to 1,150° C. for 25 hr and then allowed to cool was carried out until abnormal oxidation occurred. The results are given in the column of the oxidation resistance of Table 2. The foil material having an abnormal oxidation life of 200 hr or more was evaluated as O while the foil material having an abnormal oxidation life of less than 200 hr was evaluated as X. All the steel foils according to the examples of the present invention exhibited a long life of 200 hr or more.

Then, a metallic carrier shown in FIG. 5, that is, a metallic carrier having a capacity of 1 liter (113 mmφ × 1000 mm in length), was prepared using a corrugated sheet 3 formed by corrugating the above-described foil, the above-described foil strip (a flat sheet) 2 subjected to no working and a cylindrical jacket 1 of a ferritic stainless steel having a sheet thickness of 1.5 mm. A catalyst was supported on the carrier and applied to an engine bench test.

The engine bench test of the metallic support was carried out by mounting the catalyst supported on the metallic carrier on an exhaust gas path of an engine and effecting a thermal shock test wherein a heating-cooling cycle with the maximum temperature and the minimum temperature of the inlet exhaust gas being 950° C. and 150° C., respectively, was repeated 1200 times. When unfavorable displacement of the metallic carrier occurred during the test, the test was stopped at that time. The term "unfavorable displacement" used herein is intended to mean such an unfavorable phenomenon that breaking of the foil occurs over the whole periphery of the honeycomb to cause the honeycomb to be moved back in the direction of flow of the exhaust gas. The results are given in Table 2. When the metallic support passed the thermal shock test, it was evaluated as O, while when the metallic support did not pass the thermal shock test, it was evaluated as X. After the test, although the honeycombs according to the examples of the present invention also had slight cell deformation, they had no severe damage, whereas the comparative supports suffered from not only unfavorable displacement in the direction of flow of the exhaust gas but also severe damage, such as collapse of cell and foil breaking. In all the honeycombs of the examples of the present invention, the blistering (an increase in the length of the honeycomb) was 3% or less.

As is apparent from Table 2, the metallic carriers using the comparative foil materials having low proof stresses at 600° C. and 700° C. could not withstand a 1,200-cycle high-temperature thermal shock durability test, whereas all the metallic carriers using the foil materials having high proof stresses at 600° C. and 700° C. gave rise to no unfavorable displacement even after the 1,200-cycle thermal shock durability test and passed the high-temperature thermal shock durability test. That is, the metallic carriers using the foil materials having enhanced proof stresses at 600° C. and 700° C. were excellent in the structural durability of the honeycomb. Further, in the metallic carriers according to the examples of the present invention, the occurrence of abnormal oxidation was not observed even after the durability test, and the Al consumption of the foil was as low as about 2%, which demonstrates that these carriers have also a good oxidation resistance.

TABLE 1

|  | Mark | C | N | C + N | Cr | Al | Nb | Ta | Nb + Ta | Mo | W | Mo + W | Y | Others |
|---|---|---|---|---|---|---|---|---|---|---|---|---|---|---|
| Ex. | A1 | 0.008 | 0.0060 | 0.0140 | 20.36 | 5.11 | 0.30 | — | 0.30 | — | — | — | 0.081 | — |
| Ex. | A2 | 0.007 | 0.0048 | 0.0118 | 20.13 | 5.31 | — | 1.18 | 1.18 | — | — | — | 0.073 | — |
| Ex. | A3 | 0.007 | 0.0060 | 0.0130 | 19.96 | 5.14 | — | — | — | 2.71 | — | 2.71 | 0.101 | — |
| Ex. | A4 | 0.008 | 0.0065 | 0.0145 | 21.19 | 5.29 | — | — | — | — | 2.63 | 2.63 | 0.086 | — |
| Ex. | A5 | 0.009 | 0.0068 | 0.0158 | 20.64 | 5.23 | 0.31 | 0.62 | 0.93 | — | — | — | 0.070 | — |
| Ex. | A6 | 0.008 | 0.0074 | 0.0154 | 20.31 | 5.26 | 0.30 | — | 0.30 | 1.51 | — | 1.51 | 0.079 | — |
| Ex. | A7 | 0.009 | 0.0057 | 0.0147 | 20.94 | 5.11 | 0.31 | — | 0.31 | — | 1.03 | 1.03 | 0.083 | — |
| Ex. | A8 | 0.007 | 0.0037 | 0.0107 | 19.84 | 4.99 | — | 0.83 | 0.83 | 1.02 | — | 1.02 | 0.097 | — |
| Ex. | A9 | 0.012 | 0.0041 | 0.0161 | 19.64 | 5.00 | — | 0.92 | 0.92 | — | 1.49 | 1.49 | 0.075 | — |
| Ex. | A10 | 0.007 | 0.0038 | 0.0108 | 20.30 | 5.10 | — | — | — | 1.50 | 1.23 | 2.73 | 0.074 | — |
| Ex. | A11 | 0.006 | 0.0040 | 0.0100 | 20.10 | 4.99 | 0.30 | — | 0.30 | 1.09 | 1.40 | 2.49 | 0.097 | — |
| Ex. | A12 | 0.008 | 0.0039 | 0.0119 | 20.64 | 5.21 | 0.30 | 0.52 | 0.82 | — | 1.08 | 1.08 | 0.089 | — |
| Ex. | A13 | 0.008 | 0.0043 | 0.0123 | 19.97 | 5.36 | 0.32 | 0.63 | 0.95 | 1.21 | — | 1.21 | 0.069 | — |
| Ex. | A14 | 0.008 | 0.0049 | 0.0129 | 20.32 | 5.16 | — | 0.81 | 0.81 | 1.10 | 1.05 | 2.15 | 0.085 | — |
| Ex. | A15 | 0.012 | 0.0045 | 0.0165 | 20.64 | 5.21 | 0.30 | 0.53 | 0.83 | 1.30 | 1.15 | 2.45 | 0.078 | — |
| Ex. | A16 | 0.012 | 0.0042 | 0.0162 | 19.74 | 5.28 | 0.32 | — | 0.32 | — | — | — | 0.056 | — |
| Ex. | A17 | 0.006 | 0.0039 | 0.0099 | 20.54 | 5.36 | 0.31 | — | 0.31 | 1.52 | — | 1.52 | 0.049 | — |
| Ex. | A18 | 0.010 | 0.0036 | 0.0136 | 20.20 | 5.34 | 0.32 | — | 0.32 | 1.19 | — | 1.19 | 0.051 | — |
| Comp. Ex. | A19 | 0.007 | 0.0049 | 0.0119 | 20.10 | 5.28 | —* | —* | —* | —* | —* | —* | —* | Ln = 0.08* |

TABLE 1-continued

| | Mark | C | N | C + N | Cr | Al | Nb | Ta | Nb + Ta | Mo | W | Mo + W | Y | Others |
|---|---|---|---|---|---|---|---|---|---|---|---|---|---|---|
| Comp. Ex. | A20 | 0.008 | 0.0060 | 0.0140 | 20.34 | 5.24 | —* | —* | —* | —* | —* | —* | —* | Ln = 0.107* Ti = 0.05 |
| Comp. Ex. | A21 | 0.015 | 0.0083 | 0.0233 | 20.31 | 5.29 | 0.11* | — | 0.11* | — | — | — | 0.082 | — |
| Comp. Ex. | A22 | 0.008 | 0.0054 | 0.0134 | 19.99 | 5.34 | — | — | — | 0.81* | — | 0.81* | 0.069 | — |
| Comp. Ex. | A23 | 0.006 | 0.0090 | 0.0150 | 20.01 | 5.10 | —* | —* | —* | —* | —* | —* | —* | La = 0.07* |
| Comp. Ex. | A24 | 0.014 | 0.0052 | 0.0192 | 20.7 | 5.20 | — | 0.37* | 0.37* | — | — | — | 0.086 | — |

Note) *: Outside the scope of the invention

TABLE 2

| Classification of foil materials | | Main ingredients other than Cr and Al in foil material | High-temp. proof stress 600° C. | High-temp. proof stress 700° C. | Oxidation resistance | Results of engine bench durability test Unfavorable displacement | Results |
|---|---|---|---|---|---|---|---|
| A1 | Ex. | 0.3Nb—0.08Y | ○ | ○ | ○ | Not displaced even after 1200 cycles | ○ |
| A2 | Ex. | 1.2Ta—0.07Y | ○ | ○ | ○ | Not displaced even after 1200 cycles | ○ |
| A3 | Ex. | 2.7Mo—0.1Y | ○ | ○ | ○ | Not displaced even after 1200 cycles | ○ |
| A4 | Ex. | 2.6W—0.09Y | ○ | ○ | ○ | Not displaced even after 1200 cycles | ○ |
| A5 | Ex. | 0.3Nb—0.6Ta—0.07Y | ○ | ○ | ○ | Not displaced even after 1200 cycles | ○ |
| A6 | Ex. | 0.3Nb—1.5Mo—0.08Y | ○ | ○ | ○ | Not displaced even after 1200 cycles | ○ |
| A7 | Ex. | 0.3Nb—1W—0.08Y | ○ | ○ | ○ | Not displaced even after 1200 cycles | ○ |
| A8 | Ex. | 0.8Ta—1Mo—0.1Y | ○ | ○ | ○ | Not displaced even after 1200 cycles | ○ |
| A9 | Ex. | 0.9Ta—1.5W—0.08Y | ○ | ○ | ○ | Not displaced even after 1200 cycles | ○ |
| A10 | Ex. | 1.5Mo—1.2W—0.07Y | ○ | ○ | ○ | Not displaced even after 1200 cycles | ○ |
| A11 | Ex. | 0.3Nb—1Mo—1.4W—0.1Y | ○ | ○ | ○ | Not displaced even after 1200 cycles | ○ |
| A12 | Ex. | 0.3Nb—0.5Ta—1W—0.09Y | ○ | ○ | ○ | Not displaced even after 1200 cycles | ○ |
| A13 | Ex. | 0.3Nb—0.6Ta—1.2Mo—0.07Y | ○ | ○ | ○ | Not displaced even after 1200 cycles | ○ |
| A14 | Ex. | 0.8Ta—1.1Mo—1W—0.09Y | ○ | ○ | ○ | Not displaced even after 1200 cycles | ○ |
| A15 | Ex. | 0.3Nb—0.5Ta—1.3Mo—1.1W—0.08Y | ○ | ○ | ○ | Not displaced even after 1200 cycles | ○ |
| A16 | Ex. | 0.3Nb—0.06Y | ○ | ○ | ○ | Not displaced even after 1200 cycles | ○ |
| A17 | Ex. | 0.3Nb—1.5Mo—0.05Y | ○ | ○ | ○ | Not displaced even after 1200 cycles | ○ |
| A18 | Ex. | 0.3Nb—1Mo—0.05Y | ○ | ○ | ○ | Not displaced even after 1200 cycles | ○ |
| A19 | Comp. Ex. | 0.08Ln | X | X | ○ | Displaced after 550 cycles | X |
| A20 | Comp. Ex. | 0.107Ln—0.05Ti | X | X | ○ | Displaced after 740 cycles | X |
| A21 | Comp. Ex. | 0.1Nb—0.08Y | ○ | X | ○ | Displaced after 850 cycles | X |
| A22 | Comp. Ex. | 0.8Mo—0.07Y | X | X | ○ | Displaced after 860 cycles | X |
| A23 | Comp. Ex. | 0.07La | X | X | ○ | Displaced after 600 cycles | X |
| A24 | Comp. Ex. | 0.4Ta—0.09Y | ○ | X | ○ | Displaced after 650 cycles | X |

Example 2

The chemical ingredients of the heat-resistant stainless steels according to the present invention and comparative materials are given in Table 3. All the materials are based on 20Cr-5Al, and the steels according to the examples of the present invention (B1 to B18) comprise the 20Cr-5Al and, added thereto, Ym for the purpose of ensuring the oxidation resistance and Nb, Ta, Mo and W, either alone or in combination, for the purpose of enhancing the high-temperature proof stress. The comparative materials (B19 to B22) comprise 20Cr-5Al alone with no strengthening element added or 20Cr-5Al with, added thereto, Ti or the like.

The procedure of Example 1 was repeated to prepare foil materials and metallic carriers that were then subjected to the measurement of the high-temperature proof stress, evaluation of the oxidation resistance and engine bench test in the same manner as that of Example 1. In this case, all the steels according to the examples of the present invention had a good hot workability and a good toughness in the form of a hot-rolled sheet. The results are summarized in Table 4. As is apparent from Table 4, the metallic carriers using the comparative foil materials having low proof stresses at 600° C. and 700° C. could not withstand the 1200-cycle high-temperature thermal shock durability test, whereas all the metallic carriers using the foil materials having high proof stresses at 600° C. and 700° C. and a good oxidation resistance gave rise to no unfavorable displacement even after the 1,200-cycle thermal shock durability test and passed the high-temperature thermal shock durability test. That is, the metallic carriers using the foil materials having enhanced proof stresses at 600° C. and 700° C. were excellent in the structural durability of the honeycomb. Further, in the metallic carriers according to the examples of the present invention, the occurrence of abnormal oxidation was not observed even after the durability test, and the Al consumption of the foil was as low as about 2%, which demonstrates that these carriers have also a good oxidation resistance.

TABLE 3

| | Mark | C | N | C + N | Cr | Al | Nb | Ta | Nb + Ta | Mo | W | Mo + W | Ym | Others |
|---|---|---|---|---|---|---|---|---|---|---|---|---|---|---|
| | | | | | | | (wt. %) | | | | | | | |
| Ex. | B1 | 0.011 | 0.0085 | 0.0195 | 20.10 | 5.34 | 0.30 | — | 0.30 | — | — | — | 0.081 | — |
| Ex. | B2 | 0.010 | 0.0088 | 0.0188 | 21.09 | 5.29 | — | 1.18 | 1.18 | — | — | — | 0.089 | — |
| Ex. | B3 | 0.010 | 0.0071 | 0.0181 | 19.99 | 5.24 | — | — | — | 2.61 | — | 2.61 | 0.101 | — |
| Ex. | B4 | 0.007 | 0.0041 | 0.0111 | 20.09 | 5.28 | — | — | — | — | 2.50 | 2.50 | 0.086 | — |
| Ex. | B5 | 0.006 | 0.0044 | 0.0104 | 20.30 | 5.19 | 0.31 | 0.90 | 1.21 | — | — | — | 0.091 | — |
| Ex. | B6 | 0.008 | 0.0053 | 0.0133 | 20.10 | 5.23 | 0.30 | — | 0.30 | 1.61 | — | 1.61 | 0.070 | — |
| Ex. | B7 | 0.009 | 0.0063 | 0.0153 | 20.54 | 5.28 | 0.31 | — | 0.31 | — | 1.03 | 1.30 | 0.089 | — |
| Ex. | B8 | 0.007 | 0.0066 | 0.0136 | 19.97 | 5.21 | — | 1.09 | 1.09 | 1.11 | — | 1.11 | 0.097 | — |
| Ex. | B9 | 0.008 | 0.0053 | 0.0133 | 19.99 | 5.16 | — | 0.99 | 0.99 | — | 1.44 | 1.44 | 0.078 | — |
| Ex. | B10 | 0.009 | 0.0055 | 0.0145 | 20.31 | 5.16 | — | — | — | 1.61 | 1.11 | 2.72 | 0.076 | — |
| Ex. | B11 | 0.011 | 0.0064 | 0.0174 | 20.34 | 5.21 | 0.31 | — | 0.31 | 1.02 | 1.11 | 2.13 | 0.081 | — |
| Ex. | B12 | 0.008 | 0.0060 | 0.0140 | 20.10 | 4.99 | 0.30 | 0.81 | 1.11 | — | 1.02 | 1.02 | 0.069 | — |
| Ex. | B13 | 0.007 | 0.0041 | 0.0111 | 20.20 | 5.10 | 0.31 | 0.72 | 1.03 | 1.19 | — | 1.19 | 0.080 | — |
| Ex. | B14 | 0.011 | 0.0085 | 0.0195 | 20.54 | 5.01 | — | 0.99 | 0.99 | 1.09 | 1.08 | 2.17 | 0.066 | — |
| Ex. | B15 | 0.006 | 0.0057 | 0.0117 | 19.74 | 4.99 | 0.20 | 0.71 | 0.91 | 1.11 | 1.08 | 2.19 | 0.083 | — |
| Ex. | B16 | 0.008 | 0.0075 | 0.0155 | 20.66 | 5.11 | 0.31 | — | 0.31 | — | — | — | 0.054 | — |
| Ex. | B17 | 0.009 | 0.0067 | 0.0157 | 20.30 | 5.26 | 0.30 | — | 0.30 | 1.51 | — | 1.51 | 0.049 | — |
| Ex. | B18 | 0.008 | 0.0084 | 0.0164 | 21.15 | 5.23 | 0.29 | — | 0.29 | 1.12 | — | 1.12 | 0.052 | — |
| Comp. Ex. | B19 | 0.007 | 0.0049 | 0.0119 | 20.10 | 5.28 | —* | —* | —* | —* | —* | —* | — | Ln = 0.08* |
| Comp. Ex. | B20 | 0.008 | 0.0060 | 0.0140 | 20.34 | 5.24 | —* | —* | —* | —* | —* | —* | — | Ln = 0.107* Ti = 0.05 |
| Comp. Ex. | B21 | 0.012 | 0.0042 | 0.0162 | 19.97 | 5.21 | —* | —* | —* | 0.9* | — | 0.9* | 0.08 | — |
| Comp. Ex. | B22 | 0.014 | 0.0052 | 0.0192 | 20.7 | 5.20 | — | 0.37* | 0.37* | — | — | — | 0.07 | — |

Note) *: Outside the scope of the invention

TABLE 4

| Classification of foil materials | | Main ingredients other than Cr and Al in foil material | High-temp. proof stress | | Oxidation resistance | Results of engine bench durability test | |
|---|---|---|---|---|---|---|---|
| | | | 600° C. | 700° C. | | Unfavorable displacement | Results |
| B1 | Ex. | 0.3Nb—0.08Ym | ○ | ○ | ○ | Not displaced even after 1200 cycles | ○ |
| B2 | Ex. | 1.2Ta—0.09Ym | ○ | ○ | ○ | Not displaced even after 1200 cycles | ○ |
| B3 | Ex. | 2.6Mo—0.1Ym | ○ | ○ | ○ | Not displaced even after 1200 cycles | ○ |
| B4 | Ex. | 2.5W—0.09Ym | ○ | ○ | ○ | Not displaced even after 1200 cycles | ○ |
| B5 | Ex. | 0.3Nb—0.9Ta—0.09Ym | ○ | ○ | ○ | Not displaced even after 1200 cycles | ○ |
| B6 | Ex. | 0.3Nb—1.6Mo—0.07Ym | ○ | ○ | ○ | Not displaced even after 1200 cycles | ○ |
| B7 | Ex. | 0.31Nb—1.3W—0.09Ym | ○ | ○ | ○ | Not displaced even after 1200 cycles | ○ |
| B8 | Ex. | 1Ta—1Mo—0.1Ym | ○ | ○ | ○ | Not displaced even after 1200 cycles | ○ |
| B9 | Ex. | 1Ta—1.4W—0.08Ym | ○ | ○ | ○ | Not displaced even after 1200 cycles | ○ |
| B10 | Ex. | 1.6Mo—1.1W—0.08Ym | ○ | ○ | ○ | Not displaced even after 1200 cycles | ○ |
| B11 | Ex. | 0.3Nb—1Mo—1W—0.08Ym | ○ | ○ | ○ | Not displaced even after 1200 cycles | ○ |
| B12 | Ex. | 0.3Nb—0.8Ta—1W—0.07Ym | ○ | ○ | ○ | Not displaced even after 1200 cycles | ○ |
| B13 | Ex. | 0.3Nb—0.7Ta—1.1Mo—0.08Ym | ○ | ○ | ○ | Not displaced even after 1200 cycles | ○ |
| B14 | Ex. | 1Ta—1Mo—1W—0.07Ym | ○ | ○ | ○ | Not displaced even after 1200 cycles | ○ |
| B15 | Ex. | 0.2Nb—0.7Ta—1.1Mo—1.1W—0.08Ym | ○ | ○ | ○ | Not displaced even after 1200 cycles | ○ |
| B16 | Ex. | 0.3Nb—0.05Ym | ○ | ○ | ○ | Not displaced even after 1200 cycles | ○ |
| B17 | Ex. | 0.3Nb—1.5Mo—0.05Ym | ○ | ○ | ○ | Not displaced even after 1200 cycles | ○ |
| B18 | Ex. | 0.3Nb—1Mo—0.05Ym | ○ | ○ | ○ | Not displaced even after 1200 cycles | ○ |
| B19 | Comp. Ex. | 0.08Ln | X | X | ○ | Displaced after 550 cycles | X |
| B20 | Comp. Ex. | 0.107Ln—0.05Ti | X | X | ○ | Displaced after 740 cycles | X |
| B21 | Comp. Ex. | 0.9Mo—0.08Ym | X | X | ○ | Displaced after 870 cycles | X |
| B22 | Comp. Ex. | 0.4Ta—0.07Ym | ○ | X | ○ | Displaced after 650 cycles | X |

Example 3

The chemical ingredients of the heat-resistant stainless steels according to the present invention and comparative materials are given in Table 5. All the materials are based on 20Cr-5Al, and the steels according to the examples of the present invention (C1 to C3) comprise the 20Cr-5Al and, added thereto, Y for the purpose of ensuring the oxidation resistance and Ti and Nb in combination for the purpose of enhancing the high-temperature proof stress. The comparative materials (C4 to C7) comprise 20Cr-5Al alone with no strengthening element added or 20Cr-5Al with, added thereto, Ti or the like.

The procedure of Example 1 was repeated to prepare foil materials and metallic carriers that were then subjected to the measurement of the high-temperature proof stress, evaluation of the oxidation resistance and engine bench test in the same manner as that of Example 1. In this case, all the steels according to the examples of the present invention had a good hot workability and a good toughness in the form of a hot-rolled sheet. The results are summarized in Table 6. As is apparent from Table 6, the metallic carriers using the comparative foil materials having low proof stresses at 600° C. and 700° C. could not withstand the 1200-cycle high-temperature thermal shock durability test, whereas all the metallic carriers using the foil materials having high proof stresses at 600° C. and 700° C. and a good oxidation resistance gave rise to no unfavorable displacement even after the 1200-cycle thermal shock durability test and passed the high-temperature thermal shock durability test. That is, the metallic carriers using the foil materials having enhanced proof stresses at 600° C. and 700° C. were excellent in the structural durability of the honeycomb.

Further, in the metallic carriers according to the examples of the present invention, the occurrence of abnormal oxidation was not observed even after the durability test, and the Al consumption of the foil was as low as about 2%, which demonstrates that these carriers have also a good oxidation resistance.

The procedure of Example 1 was repeated to prepare foil materials and metallic carriers that were then subjected to the measurement of the high-temperature proof stress, evaluation of the oxidation resistance and engine bench test in the same manner as that of Example 1. In this case, all the steels according to the examples of the present invention had a good hot workability and a good toughness in the form of a hot-rolled sheet. The results are summarized in Table 8. As is apparent from Table 8, the metallic carriers using the comparative foil materials having low proof stresses at 600° C. and 700° C. could not withstand the 1,200-cycle high-temperature thermal shock durability test, whereas all the metallic carriers using the foil materials having high proof

TABLE 5

| | Mark | C | N | C + N | (wt. %) Cr | Al | Ti | Nb | Y | Others |
|---|---|---|---|---|---|---|---|---|---|---|
| Ex. | C1 | 0.006 | 0.0065 | 0.0125 | 20.00 | 5.16 | 0.034 | 0.15 | 0.081 | — |
| Ex. | C2 | 0.005 | 0.0068 | 0.0118 | 20.11 | 5.21 | 0.032 | 0.30 | 0.074 | — |
| Ex. | C3 | 0.005 | 0.0060 | 0.0110 | 19.72 | 4.99 | 0.041 | 0.51 | 0.079 | — |
| Comp. Ex. | C4 | 0.007 | 0.0049 | 0.0119 | 20.10 | 5.28 | —* | —* | —* | Ln = 0.08* |
| Comp. Ex. | C5 | 0.008 | 0.0060 | 0.0140 | 20.34 | 5.24 | 0.05 | —* | —* | Ln = 0.107* |
| Comp. Ex. | C6 | 0.007 | 0.0060 | 0.0130 | 20.41 | 5.32 | 0.01* | 0.05* | 0.080 | — |
| Comp. Ex. | C7 | 0.014 | 0.0052 | 0.0192 | 20.7 | 5.20 | 0.01* | 0.11* | 0.071 | — |

Note) *: Outside the scope of the invention

TABLE 6

| Classification of foil materials | | Main ingredients other than Cr and Al in foil material | High-temp. proof stress | | Oxidation resistance | Results of engine bench durability test | |
|---|---|---|---|---|---|---|---|
| | | | 600° C. | 700° C. | | Unfavorable displacement | Results |
| C1 | Ex. | 0.03Ti—0.15Nb—0.08Y | ○ | ○ | ○ | Not displaced even after 1200 cycles | ○ |
| C2 | Ex. | 0.03Ti—0.3Nb—0.07Y | ○ | ○ | ○ | Not displaced even after 1200 cycles | ○ |
| C3 | Ex. | 0.04Ti—0.5Nb—0.08Y | ○ | ○ | ○ | Not displaced even after 1200 cycles | ○ |
| C4 | Comp. Ex. | 0.08Ln | X | X | ○ | Displaced after 550 cycles | X |
| C5 | Comp. Ex. | 0.107Ln—0.05Ti | X | X | ○ | Displaced after 740 cycles | X |
| C6 | Comp. Ex. | 0.01Ti—0.05Nb—0.08Y | X | X | ○ | Displaced after 800 cycles | X |
| C7 | Comp. Ex. | 0.01Ti—0.11Nb—0.07Y | ○ | X | ○ | Displaced after 600 cycles | X |

Example 4

The chemical ingredients of the heat-resistant stainless steels according to the present invention and comparative materials are given in Table 7. All the materials are based on 20Cr-5Al, and the steels according to the examples of the present invention (D1 to D3) comprise the 20Cr-5Al and, added thereto, Ym for the purpose of ensuring the oxidation resistance and Ti and Nb in combination for the purpose of enhancing the high-temperature proof stress. The comparative materials (D4 to D7) comprise the 20Cr-5Al alone with no strengthening element added or the 20Cr-5Al with, added thereto, Ti or the like.

stresses at 600° C. and 700° C. and a good oxidation resistance gave rise to no unfavorable displacement even after the 1,200-cycle thermal shock durability test and passed the high-temperature thermal shock durability test. That is, the metallic carriers using the foil materials having enhanced proof stresses at 600° C. and 700° C. were excellent in the structural durability of the honeycomb. Further, in the metallic carriers according to the examples of the present invention, the occurrence of abnormal oxidation was not observed also after the durability test, and the Al consumption of the foil was as low as about 2%, which demonstrates that these carriers have also a good oxidation resistance.

TABLE 7

| | Mark | C | N | C + N | (wt. %) Cr | Al | Ti | Nb | Ym | Others |
|---|---|---|---|---|---|---|---|---|---|---|
| Ex. | D1 | 0.007 | 0.0082 | 0.0152 | 20.01 | 5.16 | 0.032 | 0.16 | 0.080 | — |
| Ex. | D2 | 0.006 | 0.0071 | 0.0131 | 20.11 | 5.22 | 0.034 | 0.31 | 0.079 | — |
| Ex. | D3 | 0.008 | 0.0079 | 0.0159 | 19.79 | 5.01 | 0.041 | 0.49 | 0.101 | — |
| Comp. Ex. | D4 | 0.007 | 0.0049 | 0.0119 | 20.10 | 5.28 | —* | —* | —* | Ln = 0.08* |
| Comp. Ex. | D5 | 0.008 | 0.0060 | 0.0140 | 20.34 | 5.24 | 0.05 | —* | —* | Ln = 0.107* |

TABLE 7-continued

| | Mark | C | N | C + N (wt. %) | Cr | Al | Ti | Nb | Ym | Others |
|---|---|---|---|---|---|---|---|---|---|---|
| Comp. Ex. | D6 | 0.006 | 0.0071 | 0.0131 | 20.09 | 5.14 | 0.015* | 0.06* | 0.091 | — |
| Comp. Ex. | D7 | 0.014 | 0.0052 | 0.0192 | 20.5 | 5.19 | 0.01* | 0.11* | 0.09 | — |

Note) *: Outside the scope of the invention

TABLE 8

| Classification of foil materials | | Main ingredients other than Cr and Al in foil material | High-temp. proof stress | | Oxidation resistance | Results of engine bench durability test | |
|---|---|---|---|---|---|---|---|
| | | | 600° C. | 700° C. | | Unfavorable displacement | Results |
| D1 | Ex. | 0.03Ti—0.16Nb—0.08Ym | ○ | ○ | ○ | Not displaced even after 1200 cycles | ○ |
| D2 | Ex. | 0.03Ti—0.3Nb—0.08Ym | ○ | ○ | ○ | Not displaced even after 1200 cycles | ○ |
| D3 | Ex. | 0.04Ti—0.5Nb—0.1Ym | ○ | ○ | ○ | Not displaced even after 1200 cycles | ○ |
| D4 | Comp. Ex. | 0.08Ln | X | X | ○ | Displaced after 550 cycles | X |
| D5 | Comp. Ex. | 0.107Ln—0.05Ti | X | X | ○ | Displaced after 740 cycles | X |
| D6 | Comp. Ex. | 0.015Ti—0.06Nb—0.09Ym | X | X | ○ | Displaced after 820 cycles | X |
| D7 | Comp. Ex. | 0.01Ti—0.11Nb—0.09Ym | ○ | X | ○ | Displaced after 600 cycles | X |

Example 5

The chemical ingredients of the heat-resistant stainless steels according to the present invention and comparative materials are given in Table 9. All the materials are based on 20Cr-5Al, and the steels according to the examples of the present invention (E1 to E20) comprise the 20Cr-5Al with, added thereto, Ln for the purpose of ensuring the oxidation resistance and Nb, Ta, Mo and W, either alone (exclusive of Nb) or in combination, for the purpose of enhancing the high-temperature proof stress. The comparative materials (E21 to E24) comprise the 20Cr-5Al alone with no strengthening element added or the 20Cr-5Al with, added thereto, Ti or the like.

The procedure of Example 1 was repeated to prepare foil materials and metallic carriers that were then subjected to the measurement of the high-temperature proof stress, evaluation of the oxidation resistance and engine bench test in the same manner as that of Example 1. In this case, all the steels according to the examples of the present invention had a good hot workability and a good toughness in the form of a hot-rolled sheet. The results are summarized in Table 10. As is apparent from Table 10, the metallic carriers using the comparative foil materials having low proof stresses at 600° C. and 700° C. could not withstand the 1200-cycle high-temperature thermal shock durability test, whereas all the metallic carriers using the foil materials having high proof stresses at 600° C. and 700° C. and a good oxidation resistance gave rise to no unfavorable displacement even after the 1200-cycle thermal shock durability test and passed the high-temperature thermal shock durability test. That is, the metallic carriers using the foil materials having enhanced proof stresses at 600° C. and 700° C. were excellent in the structural durability of the honeycomb. Further, in the metallic carriers according to the examples of the present invention, the occurrence of abnormal oxidation was not observed even after the durability test, and the Al consumption of the foil was as low as about 2%, which demonstrates that these carriers have also a good oxidation resistance.

TABLE 9

| | Mark | C | N | C + N | Cr | Al | Nb | Ta | Nb + Ta | Mo | W | Mo + W | Ln | La | P | Others |
|---|---|---|---|---|---|---|---|---|---|---|---|---|---|---|---|---|
| Ex. | E1 | 0.007 | 0.0057 | 0.0127 | 19.2 | 5.21 | — | 1.11 | 1.11 | — | — | — | 0.091 | — | 0.026 | — |
| Ex. | E2 | 0.010 | 0.0085 | 0.0185 | 19.9 | 4.92 | — | — | — | 2.60 | — | 2.60 | 0.073 | — | 0.042 | — |
| Ex. | E3 | 0.011 | 0.0071 | 0.0181 | 20.5 | 5.31 | — | — | — | — | 2.50 | 2.50 | 0.086 | — | 0.036 | — |
| Ex. | E4 | 0.007 | 0.0084 | 0.0154 | 20.3 | 5.21 | 0.31 | 0.71 | 1.02 | — | — | — | 0.078 | — | 0.027 | — |
| Ex. | E5 | 0.009 | 0.0055 | 0.0145 | 21.0 | 5.00 | 0.30 | — | 0.30 | 1.50 | — | 1.50 | 0.087 | — | 0.018 | — |
| Ex. | E6 | 0.008 | 0.0064 | 0.0144 | 19.5 | 5.34 | 0.31 | — | 0.31 | — | 1.23 | 1.23 | 0.080 | — | 0.030 | — |
| Ex. | E7 | 0.006 | 0.0044 | 0.0104 | 19.8 | 5.29 | — | 0.99 | 0.99 | 1.11 | — | 1.11 | 0.069 | — | 0.025 | — |
| Ex. | E8 | 0.008 | 0.0099 | 0.0179 | 21.0 | 4.98 | — | 1.01 | 1.01 | — | 1.48 | 1.48 | 0.071 | — | 0.026 | — |
| Ex. | E9 | 0.010 | 0.0084 | 0.0184 | 21.9 | 5.03 | — | — | — | 1.50 | 1.08 | 2.58 | 0.071 | — | 0.031 | — |
| Ex. | E10 | 0.009 | 0.0084 | 0.0174 | 20.1 | 5.14 | 0.29 | — | 0.29 | 1.11 | 1.30 | 2.41 | 0.093 | — | 0.018 | — |
| Ex. | E11 | 0.007 | 0.0077 | 0.0147 | 19.2 | 5.31 | 0.30 | 0.61 | 0.91 | — | 1.10 | 1.10 | 0.083 | — | 0.031 | — |
| Ex. | E12 | 0.011 | 0.0055 | 0.0165 | 20.3 | 5.20 | 0.31 | 0.62 | 0.93 | 1.01 | — | 1.01 | 0.086 | — | 0.031 | — |
| Ex. | E13 | 0.007 | 0.0054 | 0.0124 | 20.3 | 5.19 | — | 0.71 | 0.71 | 1.10 | 1.05 | 2.15 | 0.083 | — | 0.019 | — |
| Ex. | E14 | 0.006 | 0.0088 | 0.0148 | 21.2 | 5.09 | 0.30 | 0.55 | 0.85 | 1.02 | 1.15 | 2.17 | 0.110 | — | 0.025 | — |
| Ex. | E15 | 0.009 | 0.0048 | 0.0138 | 20.1 | 5.11 | 0.32 | — | 0.32 | — | — | — | 0.091 | — | 0.034 | — |
| Ex. | E16 | 0.007 | 0.0046 | 0.0116 | 19.3 | 5.18 | 0.51 | — | 0.51 | 1.44 | — | 1.44 | 0.095 | — | 0.036 | — |
| Ex. | E17 | 0.010 | 0.0064 | 0.0164 | 20.8 | 5.24 | 0.80 | — | 0.80 | 1.09 | — | 1.09 | 0.085 | — | 0.031 | — |
| Ex. | E18 | 0.008 | 0.0045 | 0.0125 | 20.09 | 5.31 | 0.31 | — | 0.31 | — | — | — | — | 0.08 | 0.031 | — |
| Ex. | E19 | 0.009 | 0.0077 | 0.0167 | 21.05 | 5.20 | 0.29 | — | 0.29 | 1.51 | — | 1.51 | — | 0.07 | 0.035 | — |
| Ex. | E20 | 0.007 | 0.0081 | 0.0151 | 19.98 | 5.12 | 0.28 | — | 0.28 | 1.09 | — | 1.09 | — | 0.11 | 0.018 | — |
| Comp. Ex. | E21 | 0.007 | 0.0049 | 0.0119 | 20.10 | 5.28 | —* | —* | —* | —* | —* | —* | 0.08 | — | 0.018 | — |
| Comp. Ex. | E22 | 0.008 | 0.0060 | 0.0140 | 20.34 | 5.24 | —* | —* | —* | —* | —* | —* | 0.107 | — | 0.019 | Ti = 0.05* |

TABLE 9-continued

| | Mark | C | N | C + N | Cr | Al | Nb | Ta | Nb + Ta | Mo | W | Mo + W | Ln | La | P | Others |
|---|---|---|---|---|---|---|---|---|---|---|---|---|---|---|---|---|
| Ex. Comp. Ex. | E23 | 0.009 | 0.0054 | 0.0144 | 21.11 | 5.27 | — | — | — | 0.9* | — | 0.9* | —* | — | —* | Y = 0.08* |
| Ex. Comp. Ex. | E24 | 0.014 | 0.0053 | 0.0193 | 20.7 | 5.20 | — | 0.37* | 0.37* | — | — | — | 0.079 | — | 0.032 | — |

Note) *: Outside the scope of the invention

TABLE 10

| Classification of foil materials | | Main ingredients other than Cr and Al in foil material | High-temp. proof stress 600° C. | High-temp. proof stress 700° C. | Oxidation resistance | Results of engine bench durability test Unfavorable displacement | Results |
|---|---|---|---|---|---|---|---|
| E1 | Ex. | 1.1Ta—0.09Ln | ○ | ○ | ○ | Not displaced even after 1200 cycles | ○ |
| E2 | Ex. | 2.6Mo—0.07Ln | ○ | ○ | ○ | Not displaced even after 1200 cycles | ○ |
| E3 | Ex. | 2.5W—0.09Ln | ○ | ○ | ○ | Not displaced even after 1200 cycles | ○ |
| E4 | Ex. | 0.3Nb—0.7Ta—0.08Ln | ○ | ○ | ○ | Not displaced even after 1200 cycles | ○ |
| E5 | Ex. | 0.3Nb—1.5Mo—0.09Ln | ○ | ○ | ○ | Not displaced even after 1200 cycles | ○ |
| E6 | Ex. | 0.3Nb—1.2W—0.08Ln | ○ | ○ | ○ | Not displaced even after 1200 cycles | ○ |
| E7 | Ex. | 1Ta—1.1Mo—0.07Ln | ○ | ○ | ○ | Not displaced even after 1200 cycles | ○ |
| E8 | Ex. | 1Ta—1.5W—0.07Ln | ○ | ○ | ○ | Not displaced even after 1200 cycles | ○ |
| E9 | Ex. | 1.5Mo—1W—0.07Ln | ○ | ○ | ○ | Not displaced even after 1200 cycles | ○ |
| E10 | Ex. | 0.3Nb—1.1Mo—1.3W—0.09Ln | ○ | ○ | ○ | Not displaced even after 1200 cycles | ○ |
| E11 | Ex. | 0.3Nb—0.6Ta—1.1W—0.08Ln | ○ | ○ | ○ | Not displaced even after 1200 cycles | ○ |
| E12 | Ex. | 0.3Nb—0.6Ta—1Mo—0.09Ln | ○ | ○ | ○ | Not displaced even after 1200 cycles | ○ |
| E13 | Ex. | 0.7Ta—1.1Mo—1W—0.08Ln | ○ | ○ | ○ | Not displaced even after 1200 cycles | ○ |
| E14 | Ex. | 0.3Nb—0.6Ta—1Mo—1.1W—0.11Ln | ○ | ○ | ○ | Not displaced even after 1200 cycles | ○ |
| E15 | Ex. | 0.3Nb—0.09Ln | ○ | ○ | ○ | Not displaced even after 1200 cycles | ○ |
| E16 | Ex. | 0.5Nb—1.4Mo—0.1Ln | ○ | ○ | ○ | Not displaced even after 1200 cycles | ○ |
| E17 | Ex. | 0.8Nb—1Mo—0.09Ln | ○ | ○ | ○ | Not displaced even after 1200 cycles | ○ |
| E18 | Ex. | 0.3Nb—0.08La | ○ | ○ | ○ | Not displaced even after 1200 cycles | ○ |
| E19 | Ex. | 0.3Nb—1.5Mo—0.07La | ○ | ○ | ○ | Not displaced even after 1200 cycles | ○ |
| E20 | Ex. | 0.3Nb—1Mo—0.1La | ○ | ○ | ○ | Not displaced even after 1200 cycles | ○ |
| E21 | Comp. Ex. | 0.08Ln | X | X | ○ | Displaced after 550 cycles | X |
| E22 | Comp. Ex. | 0.107Ln—0.05Ti | X | X | ○ | Displaced after 740 cycles | X |
| E23 | Comp. Ex. | 0.08Y—0.9Mo | X | X | ○ | Displaced after 850 cycles | X |
| E24 | Comp. Ex. | 0.09Ln—0.4Ta | ○ | X | ○ | Displaced after 600 cycles | X |

Example 6

The chemical ingredients of the heat-resistant stainless steels according to the present invention and comparative materials are given in Table 11. All the materials are based on 20Cr-5Al, and the steels according to the examples of the present invention (F1 to F6) comprise the 20Cr-5Al with, added thereto, Ln for the purpose of ensuring the oxidation resistance and Ti and Nb in combination for the purpose of enhancing the high-temperature proof stress. The comparative materials (F7 to F10) comprise the 20Cr-5Al alone with no strengthening element added or the 20Cr-5Al with, added thereto, Ti or the like.

The procedure of Example 1 was repeated to prepare foil materials and metallic carriers that were then subjected to the measurement of the high-temperature proof stress, evaluation of the oxidation resistance and engine bench test in the same manner as that of Example 1. In this case, all the steels according to the examples of the present invention had a good hot workability and a good toughness in the form of a hot-rolled sheet. The results are summarized in Table 12. As is apparent from Table 12, the metallic carriers using the comparative foil materials having low proof stresses at 600° C. and 700° C. could not withstand the 1,200-cycle high-temperature thermal shock durability test, whereas all the metallic carriers using the foil materials having high proof stresses at 600° C. and 700° C. and a good oxidation resistance gave rise to no unfavorable displacement even after the 1200-cycle thermal shock durability test and passed the high-temperature thermal shock durability test. That is, the metallic carriers using the foil materials having enhanced proof stresses at 600° C. and 700° C. were excellent in the structural durability of the honeycomb. Further, in the metallic carriers according to the examples of the present invention, the occurrence of abnormal oxidation was not observed even after the durability test, and the Al consumption of the foil was as low as about 2%, which demonstrates that these carriers have also a good oxidation resistance.

TABLE 11

| | Mark | C | N | C + N | Cr | Al | Ti | Nb | Ln | La | P |
|---|---|---|---|---|---|---|---|---|---|---|---|
| Ex. | F1 | 0.005 | 0.0078 | 0.0128 | 20.19 | 5.19 | 0.031 | 0.16 | 0.081 | — | 0.031 |
| Ex. | F2 | 0.005 | 0.0060 | 0.0110 | 19.98 | 4.99 | 0.035 | 0.30 | 0.101 | — | 0.035 |
| Ex. | F3 | 0.006 | 0.0075 | 0.0135 | 20.00 | 5.16 | 0.040 | 0.51 | 0.079 | — | 0.029 |
| Ex. | F4 | 0.008 | 0.0084 | 0.0164 | 21.09 | 4.93 | 0.032 | 0.20 | — | 0.092 | 0.034 |
| Ex. | F5 | 0.007 | 0.0077 | 0.0147 | 20.05 | 5.20 | 0.031 | 0.28 | — | 0.073 | 0.031 |
| Ex. | F6 | 0.009 | 0.0048 | 0.0138 | 22.31 | 5.13 | 0.035 | 0.35 | — | 0.065 | 0.020 |

TABLE 11-continued

|  | Mark | C | N | C + N (wt. %) | Cr | Al | Ti | Nb | Ln | La | P |
|---|---|---|---|---|---|---|---|---|---|---|---|
| Comp. Ex. | F7 | 0.007 | 0.0049 | 0.0119 | 20.10 | 5.28 | —* | —* | 0.080 | — | 0.018 |
| Comp. Ex. | F8 | 0.008 | 0.0060 | 0.0140 | 20.34 | 5.24 | 0.05 | —* | 0.107 | — | 0.015 |
| Comp. Ex. | F9 | 0.008 | 0.0043 | 0.0123 | 21.35 | 5.13 | —* | 0.08* | 0.089 | — | 0.030 |
| Comp. Ex. | F10 | 0.014 | 0.0052 | 0.0192 | 20.5 | 5.18 | 0.01* | 0.11* | 0.09 | — | 0.032 |

Note) *: Outside the scope of the invention

TABLE 12

| Classification of foil materials | | Main ingredients other than Cr and Al in foil material | High-temp. proof stress | | Oxidation resistance | Results of engine bench durability test | |
|---|---|---|---|---|---|---|---|
|  |  |  | 600° C. | 700° C. |  | Unfavorable displacement | Results |
| F1 | Ex. | 0.03Ti—0.16Nb—0.08Ln | ○ | ○ | ○ | Not displaced even after 1200 cycles | ○ |
| F2 | Ex. | 0.035Ti—0.3Nb—0.1Ln | ○ | ○ | ○ | Not displaced even after 1200 cycles | ○ |
| F3 | Ex. | 0.04Ti—0.5Nb—0.08Ln | ○ | ○ | ○ | Not displaced even after 1200 cycles | ○ |
| F4 | Ex. | 0.03Ti—0.2Nb—0.09La | ○ | ○ | ○ | Not displaced even after 1200 cycles | ○ |
| F5 | Ex. | 0.03Ti—0.3Nb—0.07La | ○ | ○ | ○ | Not displaced even after 1200 cycles | ○ |
| F6 | Ex. | 0.035Ti—0.35Nb—0.07La | ○ | ○ | ○ | Not displaced even after 1200 cycles | ○ |
| F7 | Comp. Ex. | 0.08Ln | X | X | ○ | Displaced after 550 cycles | X |
| F8 | Comp. Ex. | 0.107Ln—0.05Ti | X | X | ○ | Displaced after 740 cycles | X |
| F9 | Comp. Ex. | 0.09Ln—0.08Nb | X | X | ○ | Displaced after 800 cycles | X |
| F10 | Comp. Ex. | 0.09Ln—0.11Nb | ○ | X | ○ | Displaced after 600 cycles | X |

INDUSTRIAL APPLICABILITY

As is apparent also from the Examples, the Fe-Cr-Al-base alloys used in the present invention have a good hot workability, a good toughness in the form of a hot-rolled sheet and, therefore, an excellent formability into a foil or the like and are excellent in resistance to the occurrence of abnormal oxidation, not to mention oxidation resistance, and excellent in thermal fatigue resistance by virtue of their excellent high-temperature proof stress, that is, can exhibit as a honeycomb structure excellent oxidation resistance and structural durability with respect to the occurrence of troubles, such as change of shape, failure, etc., which is particularly worthy of attention.

Thus, the highly heat resistant metallic carrier for an automobile catalyst according to the present invention has a highly heat-resistant property sufficient to withstand an engine thermal shock test wherein the maximum temperature is 950° C.

Therefore, the present invention can provide an excellent metallic carrier that can sufficiently cope with an increase in the temperature of an automobile engine exhaust gas, which renders the present invention very useful from the viewpoint of industry.

We claim:

1. A metallic carrier for an automobile catalyst, comprising a metallic honeycomb and a jacket, characterized in that said metallic honeycomb comprises a foil material comprising an Fe-Cr-Al-base alloy and having proof stresses of 22 kgf/mm² or more and 11 kgf/mm² or more respectively at 600° C. and 700° C., the foil material being annealed at a temperature of the recrystallization temperature of the foil material or above.

2. The metallic carrier according to claim 1, wherein said foil material is a stainless steel foil material which comprises, in terms of % by weight, more than 0.01 to 0.5% Y, 4.5 to 6.5% Al, 13 to 25% Cr, 0.025% or less of C and 0.02% or less N, the total of C and N being 0.03% or less, and, further, at least one member selected from the group consisting of (93.C/12+93.N/14)×1.1% to 3% Nb, (181.C/12+181.N/14)×1.5% to 3% Ta, 1 to 4% Mo and 1 to 4% W, the total of Ta and Nb being 3% or less, the total of Mo and W being 4% or less, with the balance consisting of Fe and unavoidable impurities.

3. The metallic carrier according to claim 1, wherein said foil material is a stainless steel foil material which comprises, in terms of % by weight, more than 0.01 to 0.5% Ym, said Ym comprising about 60% Y, about 35% heavy rare earth elements (Gd, Tb, Dy, Ho, Er, Tm, Yb and Lu) and about 5% light rare earth elements (La, Ce, Pr, Nd, Pm, Sm and Eu), 4.5 to 6.5% Al, 13 to 25% of Cr, 0.025% or less C and 0.02% or less of N, the total C and N being 0.03% or less, and, further, at least one member selected from the group consisting of (93.C/12+93.N/14)×1.1% to 3% Nb, (181.C/12+181.N/14)×1.5% to 3% Ta, 1 to 4% Mo and 1 to 4% W, the total of Ta and Nb being 3% or less, the total of Mo and W being 4% or less, with the balance consisting of Fe and unavoidable impurities.

4. The metallic carrier according to claim 1, wherein said foil material is a stainless steel foil material which comprises, in terms of % by weight, more than 0.01 to 0.5% Y, 4.5 to 6.5% Al, 13 to 25% Cr, 0.025% or less of C, 0.02% or less N, the total of C and N being 0.03% or less, 0.02% to (0.03+4.C+24.N/7) % Ti and more than (93.C/12+93.N/14) % to 2.0% Nb, with the balance consisting of Fe and unavoidable impurities.

5. The metallic carrier according to claim 1, wherein said foil material is a stainless steel foil material which comprises, in terms of % by weight, more than 0.01 to 0.5% Ym, 4.5 to 6.5% Al, 13 to 25% Cr, 0.025% or less of C, 0.02% or less N, the total of C and N being 0.03% or less, 0.02% to (0.03+4.C+24.N/7) % Ti and more than (93.C/12+93.N/14) % to 2.0% Nb, with the balance consisting of Fe and unavoidable impurities.

6. The metallic carrier according to claim 1, wherein said foil material is a stainless steel foil material which comprises, in terms of % by weight, more than 0.06 to 0.15% Ln, said Ln being at least one element selected from the group consisting of La, Pr, Ce and Nd, 8×(Ln+0.015)/45% to 0.1% P, 4.5 to 6.5% Al, 13 to 25% Cr, 0.025% or less C and 0.02% or less of N, the total of C and N being 0.03% or less, and, further, at least one member selected from the group consisting of (181.C/12+181.N/14)×1.5% to 3% Ta, (93.C/12+93.N/14)×1.1% to 3% Nb, 1 to 4% Mo and 1 to 4% W, the total of Ta and Nb being 3% or less, the total of Mo and W being 4% or less, with the balance consisting of Fe and unavoidable impurities.

7. The metallic carrier according to claim 1, wherein said foil material is a stainless steel foil material which comprises, in terms of % by weight, more than 0.06 to 0.15% Ln, 8×(Ln+0.015)/45% to 0.1% P, 4.5 to 6.5% Al, 13 to 25% Cr, 0.025% or less C, 0.02% or less of N, the total of C and N being 0.03% or less, 0.02% to (0.03+4.C+24.N/7) % Ti and more than (93.C/12+93.N/14) % to 2.0% Nb, with the balance consisting Fe and unavoidable impurities.

* * * * *